(12) United States Patent
Kennedy et al.

(10) Patent No.: US 8,466,234 B2
(45) Date of Patent: Jun. 18, 2013

(54) AMPHIPHILIC NETWORKS, PROCESS FOR PRODUCING SAME, AND PRODUCTS MADE THEREFROM

(75) Inventors: Joseph P. Kennedy, Akron, OH (US); Radhakrishnan Karunakaran, Lake Jackson, TX (US)

(73) Assignee: The University of Akron, Akron, OH (US)

( * ) Notice: Subject to any disclaimer, the term of this patent is extended or adjusted under 35 U.S.C. 154(b) by 476 days.

(21) Appl. No.: 12/525,143

(22) PCT Filed: Apr. 4, 2008

(86) PCT No.: PCT/US2008/004444
§ 371 (c)(1),
(2), (4) Date: Feb. 2, 2010

(87) PCT Pub. No.: WO2008/124093
PCT Pub. Date: Oct. 16, 2008

(65) Prior Publication Data
US 2010/0137517 A1 Jun. 3, 2010

Related U.S. Application Data

(60) Provisional application No. 60/921,921, filed on Apr. 4, 2007, provisional application No. 61/069,375, filed on Mar. 14, 2008.

(51) Int. Cl.
*C08F 287/00* (2006.01)
*C08G 77/04* (2006.01)
(52) U.S. Cl.
USPC ........... 525/100; 525/242; 525/279; 525/280; 525/281; 525/294; 525/299; 525/479
(58) Field of Classification Search
USPC ............... 525/479, 100, 242, 279, 280, 281, 525/294, 299
See application file for complete search history.

(56) References Cited

U.S. PATENT DOCUMENTS

| 5,073,381 | A | 12/1991 | Ivan | |
|---|---|---|---|---|
| 5,523,359 | A | 6/1996 | Shaffer | |
| 6,703,441 | B2 | 3/2004 | Huseman | |
| 2002/0098214 | A1* | 7/2002 | Adams et al. | 424/401 |
| 2003/0022991 | A1 | 1/2003 | Kennedy | |
| 2007/0280983 | A1* | 12/2007 | Strickler et al. | 424/422 |
| 2008/0153982 | A1* | 6/2008 | Lai et al. | 525/91 |

FOREIGN PATENT DOCUMENTS

WO WO2006073499 A2 7/2006

OTHER PUBLICATIONS

Erdodi, et al., "Amphiphilic Co-Networks: Definition, synthesis, applications", Prog. Polymer Science. 31 (2006) 1-18.
Erdodi, et al., "Third-Generation Amphiphilic Conetworks. I. Synthesis and Swelling Behavior of Poly(N,N-dimethyl acrylamide)/Polydimethylsiloxane Conetworks", Journal of Polymer Science: Part A: Polymer Chemistry, vol. 44 (2007) 295-307.

* cited by examiner

*Primary Examiner* — Jeffrey Mullis
(74) *Attorney, Agent, or Firm* — Renner, Kenner, Greive, Bobak, Taylor, Weber

(57) ABSTRACT

The present invention relates to the production of amphiphilic copolymer networks, or co-networks, and to methods for preparing amphiphilic co-networks. Furthermore, the present invention relates to products and/or films made from the amphiphilic co-networks produced in accordance with the synthesis methods of the present invention. In one embodiment, the present invention is related to crosslinkable and/or polymerizable compositions that can be utilized to form amphiphilic co-networks, where such compositions are block copolymer compositions that are formed from the combination of at least one hydrophilic segment, at least one hydrophobic segment, and at least one crosslinkable and/or polymerizable segment. In yet another embodiment, the present invention relates to amphiphilic co-networks that are optically clear and highly oxyphilic.

29 Claims, 6 Drawing Sheets

AMPHIPHILIC NETWORKS, PROCESS FOR PRODUCING SAME, AND PRODUCTS MADE THEREFROM

FIELD OF THE INVENTION

The present invention relates to the production of amphiphilic copolymer networks, or co-networks, and to methods for preparing amphiphilic co-networks. Furthermore, the present invention relates to products and/or films made from the amphiphilic co-networks produced in accordance with the synthesis methods of the present invention. In one embodiment, the present invention is related to crosslinkable and/or polymerizable compositions that can be utilized to form amphiphilic co-networks, where such compositions are block copolymer compositions that are formed from the combination of at least one hydrophilic segment, at least one hydrophobic segment, and at least one crosslinkable and/or polymerizable segment. In another embodiment, the present invention relates to crosslinkable and/or polymerizable compositions that can be utilized to form amphiphilic co-networks, where the compositions are block copolymer compositions that are formed from at least one hydrophilic segment and at least two hydrophobic segments, with at least one of the hydrophilic or hydrophobic segments being crosslinkable and/or polymerizable. In still another embodiment, the crosslinkable and/or polymerizable block copolymer compositions of the present invention comprise at least five polymer blocks with the five or more polymer blocks alternating between hydrophilic and hydrophobic blocks. In yet another embodiment, the present invention relates to amphiphilic co-networks that are optically clear and highly oxyphilic.

BACKGROUND OF THE INVENTION

Amphiphilic co-networks can serve as a means to encapsulate and thereby immunoisolate implantable biologically active moieties. Generally, amphiphilic co-networks comprise hydrophilic and hydrophobic polymers that can swell in both polar and non-polar solvents. Additionally, amphiphilic networks and/or co-networks can be used to produce polymer films that swell in both polar and non-polar solvents. Accordingly, films made from amphiphilic polymer networks and/or co-networks have been found to be desirable in the production of various articles including, but not limited to, contact lenses.

One problem associated with the synthesis of amphiphilic co-networks is how to overcome the thermodynamic incompatibility of the hydrophilic and hydrophobic constituents that will make up the amphiphilic co-network, and to unite two incompatible pre-polymers and/or polymers into a bi-continuous/bi-percolating construct. Typically, crosslinking of such systems is carried out in homogeneous solution in a common solvent at low pre-polymer and/or polymer concentrations, followed by the addition of a suitable crosslinker (i.e., by dissolving the two pre-polymers which are generally incompatible in their dry states). While this method yields uniform co-networks, the removal of the common solvent is accompanied by massive shrinkage, which renders the method technically impractical. Also, the dimensional stability of such co-networks is poor, the surface properties are hard to control, and the co-networks (or products formed therefrom) are fragile and difficult to manipulate.

Thus, there is a need in the art for reliable synthesis routes for amphiphilic co-networks. Specifically, desirable synthesis routes would include those that permit the control of one or more chemical and/or physical properties of amphiphilic co-networks. Also of interest are synthesis routes for amphiphilic co-networks that produce amphiphilic co-networks that are suitable for use in medical (e.g., cell encapsulation), biological and ophthalmic uses.

SUMMARY OF THE INVENTION

The present invention relates to the production of amphiphilic copolymer networks, or co-networks, and to methods for preparing amphiphilic co-networks. Furthermore, the present invention relates to products and/or films made from the amphiphilic co-networks produced in accordance with the synthesis methods of the present invention. In one embodiment, the present invention is related to crosslinkable and/or polymerizable compositions that can be utilized to form amphiphilic co-networks, where such compositions are block copolymer compositions that are formed from the combination of at least one hydrophilic segment, at least one hydrophobic segment, and at least one crosslinkable and/or polymerizable segment. In another embodiment, the present invention relates to crosslinkable and/or polymerizable compositions that can be utilized to form amphiphilic co-networks, where the compositions are block copolymer compositions that are formed from at least one hydrophilic segment and at least two hydrophobic segments, with at least one of the hydrophilic or hydrophobic segments being crosslinkable and/or polymerizable. In still another embodiment, the crosslinkable and/or polymerizable block copolymer compositions of the present invention comprise at least five polymer blocks with the five or more polymer blocks alternating between hydrophilic and hydrophobic blocks. In yet another embodiment, the present invention relates to amphiphilic co-networks that are optically clear and highly oxyphilic.

In one embodiment, the present invention relates to a crosslinkable and/or polymerizable block copolymer composition comprising at least one composition according to the following Formula:

$$R-(Y)_a-(Hi)_x-(Ho)_y-(Hi)_z-(Y)_b-R \quad (I)$$

where (Hi) represents a hydrophilic polymer segment and (Ho) represents a hydrophobic polymer segment; where x, y and z represent the number of repeating units in each hydrophilic (Hi) and/or hydrophobic (Ho) polymer segment, with each of x, y and z being independently selected from an integer in the range of about 2 to about 5,000; where each Y is independently selected from acrylate, methacrylate, an alkyl acrylate having between 3 and about 15 carbon atoms, or an allyl group having between 3 and about 15 carbon atoms; where a and b represent the number of Y units in Formula (I), with each of a and b being independently selected from an integer in the range of 0 to about 12, with the proviso that a and b can not both be equal to zero; and where each R is independently selected from linear $C_1$ to $C_{10}$ alkyl groups, substituted linear $C_1$ to $C_{10}$ alkyl groups, branched $C_3$ to $C_{10}$ alkyl groups, or substituted branched $C_3$ to $C_{10}$ alkyl groups, where the one or more substituents on any substituted group are selected from HS—, S, —CN, O, N, —NH$_3$, —C$_6$H$_5$, P, —OH, —S(CS)S—, —S(CS)O—, —S(CS)N, or a halogen.

In another embodiment, the present invention relates to a crosslinkable and/or polymerizable block copolymer composition comprising at least one composition according to the following Formula:

$$R-(Y)_a-(Ho)_x-(Hi)_y-(Ho)_z-(Y)_b-R \quad (II)$$

where (Hi) represents a hydrophilic segment and (Ho) represents a hydrophobic segment; where x, y and z represent the number of repeating units in each hydrophilic (Hi) and/or hydrophobic (Ho) segment, with each of x, y and z being independently selected from an integer in the range of about 2 to about 5,000; where each Y is independently selected from acrylate, methacrylate, an alkyl acrylate having between 3 and about 15 carbon atoms, or an allyl group having between 3 and about 15 carbon atoms; where a and b represent the number of Y units in Formula (II), with each of a and b being independently selected from an integer in the range of 0 to about 12, with the proviso that a and b can not both be equal to zero; and where each R is independently selected from linear $C_1$ to $C_{10}$ alkyl groups, substituted linear $C_1$ to $C_{10}$ alkyl groups, branched $C_3$ to $C_{10}$ alkyl groups, or substituted branched $C_3$ to $C_{10}$ alkyl groups, where the one or more substituents on any substituted group are selected from HS—, S, —CN, O, N, —NH$_3$, —C$_6$H$_5$, P, —OH, —S(CS)S—, —S(CS)O—, —S(CS)N, or a halogen.

In still another embodiment, the present invention relates to a crosslinkable and/or polymerizable block copolymer composition comprising at least one composition according to the following Formula:

$$R\text{-}(Hi)_x\text{-}(Y)_a\text{—}(Ho)_y\text{—}(Y)_b(Hi)_z\text{-}R \qquad (III)$$

where (Hi) represents a hydrophilic polymer segment and (Ho) represents a hydrophobic polymer segment; where x, y and z represent the number of repeating units in each hydrophilic (Hi) and/or hydrophobic (Ho) polymer segment, with each of x, y and z being independently selected from an integer in the range of about 2 to about 5,000; where each Y is independently selected from acrylate, methacrylate, an alkyl acrylate having between 3 and about 15 carbon atoms, or an allyl group having between 3 and about 15 carbon atoms; where a and b represent the number of Y units in Formula (III), with each of a and b being independently selected from an integer in the range of 0 to about 12, with the proviso that a and b can not both be equal to zero; and where each R is independently selected from linear $C_1$ to $C_{10}$ alkyl groups, substituted linear $C_1$ to $C_{10}$ alkyl groups, branched $C_3$ to $C_{10}$ alkyl groups, or substituted branched $C_3$ to $C_{10}$ alkyl groups, where the one or more substituents on any substituted group are selected from HS—, S, —CN, O, N, —NH$_3$, —C$_6$H$_5$, P, —OH, —S(CS)S—, —S(CS)O—, —S(CS)N, or a halogen.

In still yet another embodiment, the present invention relates to a crosslinkable and/or polymerizable block copolymer composition comprising at least one composition according to the following Formula:

$$R\text{—}(Ho)_x\text{—}(Y)_a\text{-}(Hi)_y\text{-}(Y)_b\text{—}(Ho)_z\text{—}R \qquad (IV)$$

where (Hi) represents a hydrophilic segment and (Ho) represents a hydrophobic segment; where x, y and z represent the number of repeating units in each hydrophilic (Hi) and/or hydrophobic (Ho) segment, with each of x, y and z being independently selected from an integer in the range of about 2 to about 5,000; where each Y is independently selected from acrylate, methacrylate, an alkyl acrylate having between 3 and about 15 carbon atoms, or an allyl group having between 3 and about 15 carbon atoms; where a and b represent the number of Y units in Formula (IV), with each of a and b being independently selected from an integer in the range of 0 to about 12, with the proviso that a and b can not both be equal to zero; and where each R is independently selected from linear $C_1$ to $C_{10}$ alkyl groups, substituted linear $C_1$ to $C_{10}$ alkyl groups, branched $C_3$ to $C_{10}$ alkyl groups, or substituted branched $C_3$ to $C_{10}$ alkyl groups, where the one or more substituents on any substituted group are selected from HS—, S, —CN, O, N, —NH$_3$, —C$_6$H$_5$, P, —OH, —S(CS)S—, —S(CS)O—, —S(CS)N, or a halogen.

In still yet another embodiment, the present invention relates to a block copolymer composition comprising at least one block copolymer composition according to the following Formula:

where each R is independently selected from linear $C_1$ to $C_{10}$ alkyl groups, substituted linear $C_1$ to $C_{10}$ alkyl groups, branched $C_3$ to $C_{10}$ alkyl groups, or substituted branched $C_3$ to $C_{10}$ alkyl groups, where the one or more substituents on any substituted group are selected from HS—, S, —CN, O, N, —NH$_3$, —C$_6$H$_5$, P, —OH, —S(CS)S—, —S(CS)O—, —S(CS)N, or a halogen; where each Y is independently selected from acrylate, methacrylate, an alkyl acrylate having between 3 and about 15 carbon atoms, or an allyl group having between 3 and about 15 carbon atoms; where a and b represent the number of Y units in the above Formula, with each of a and b being independently selected from an integer in the range of 0 to about 12, with the proviso that a and b can not both be equal to zero; where each Q is independently selected from a linear or branched $C_1$ to $C_{20}$ alkyl group; where PDMAAm represents repeating hydrophilic polymer segments based on a polydimethyl acrylamide polymer with the number of repeating units in each PDMAAm segment being in the range of about 2 to about 5,000; and where PDMS represents repeating hydrophobic polymer segments based on a polydimethylsiloxane polymer with the number of repeating units being in the range of about 2 to about 5,000.

In still yet another embodiment, the present invention relates to a crosslinkable and/or polymerizable block copolymer composition comprising at least one composition according to the following Formula:

$$R\text{-}(Hi)_x\text{-}(Ho_2)_a\text{—}(Ho_1)_b\text{—}(Ho_2)_c\text{-}(Hi)_y\text{-}R \qquad (V),$$

where (Hi) represents hydrophilic segments formed from one or more hydrophilic polymers; where (Ho$_1$) and (Ho$_2$) represent hydrophobic segments formed from two or more different hydrophobic polymers; where a, b, c, x and y represent the number of units in each hydrophilic (Hi) and/or hydrophobic (Ho$_1$ and Ho$_2$) segment, with each of a, b and c being independently selected from an integer in the range of about 2 to about 5,000, while each of x and y are independently selected from an integer in the range of 1 to about 5,000; where each R is independently selected from linear $C_1$ to $C_{10}$ alkyl groups, substituted linear $C_1$ to $C_{10}$ alkyl groups, branched $C_3$ to $C_{10}$ alkyl groups, or substituted branched $C_3$ to $C_{10}$ alkyl groups, where the one or more substituents on any substituted group are selected from HS—, S, —CN, O, N, —NH$_3$, —C$_6$H$_5$, P, —OH, —S(CS)S—, —S(CS)O—, —S(CS)N, or a halogen; and where at least one of the hydrophilic (Hi) and/or hydrophobic (Ho$_1$ and Ho$_2$) segments contain at least one crosslinkable and/or polymerizable moiety.

In still yet another embodiment, the present invention relates to a crosslinkable and/or polymerizable block copolymer composition comprising at least one composition according to the following Formula:

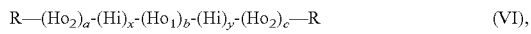

$$R-(Ho_2)_a-(Hi)_x-(Ho_1)_b-(Hi)_y-(Ho_2)_c-R \quad (VI),$$

where (Hi) represents hydrophilic segments formed from one or more hydrophilic polymers; where ($Ho_1$) and ($Ho_2$) represent hydrophobic segments formed from two or more different hydrophobic polymers; where a, b, c, x and y represent the number of units in each hydrophilic (Hi) and/or hydrophobic ($Ho_1$ and $Ho_2$) segment, with each of b, x and y being independently selected from an integer in the range of about 2 to about 5,000, while each of a and c are independently selected from an integer in the range of 1 to about 5,000; where each R is independently selected from linear $C_1$ to $C_{10}$ alkyl groups, substituted linear $C_1$ to $C_{10}$ alkyl groups, branched $C_3$ to $C_{10}$ alkyl groups, or substituted branched $C_3$ to $C_{10}$ alkyl groups, where the one or more substituents on any substituted group are selected from HS—, S, —CN, O, N, —$NH_3$, —$C_6H_5$, P, —OH, —S(CS)S—, —S(CS)O—, —S(CS)N, or a halogen; and where at least one of the hydrophilic (Hi) and/or hydrophobic ($Ho_1$ and $Ho_2$) segments contain at least one crosslinkable and/or polymerizable moiety.

In still yet another embodiment, the present invention relates to a crosslinkable and/or polymerizable block copolymer composition comprising at least one composition according to the following Formula:

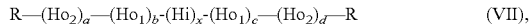

$$R-(Ho_2)_a-(Ho_1)_b-(Hi)_x-(Ho_1)_c-(Ho_2)_d-R \quad (VII),$$

where (Hi) represents hydrophilic segments formed from one or more hydrophilic polymers; where ($Ho_1$) and ($Ho_2$) represent hydrophobic segments formed from two or more different hydrophobic polymers; where a, b, c, d and x represent the number of units in each hydrophilic (Hi) and/or hydrophobic ($Ho_1$ and $Ho_2$) segment, with each of b, c and x being independently selected from an integer in the range of about 2 to about 5,000, while each of a and d are independently selected from an integer in the range of 1 to about 5,000; where each R is independently selected from linear $C_1$ to $C_{10}$ alkyl groups, substituted linear $C_1$ to $C_{10}$ alkyl groups, branched $C_3$ to $C_{10}$ alkyl groups, or substituted branched $C_3$ to $C_{10}$ alkyl groups, where the one or more substituents on any substituted group are selected from HS—, S, —CN, O, N, —$NH_3$, —$C_6H_5$, P, —OH, —S(CS)S—, —S(CS)O—, —S(CS)N, or a halogen; and where at least one of the hydrophilic (Hi) and/or hydrophobic ($Ho_1$ and $Ho_2$) segments contain at least one crosslinkable and/or polymerizable moiety.

In still yet another embodiment, the present invention relates to a crosslinkable and/or polymerizable block copolymer composition comprising at least one composition according to the following Formula:

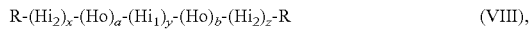

$$R-(Hi_1)_x-(Ho)_a-(Hi_1)_y-(Ho)_b-(Hi_2)_z-R \quad (VIII),$$

where ($Hi_1$) and ($Hi_2$) represent hydrophilic segments formed from two or more hydrophilic polymers; where (Ho) represents hydrophobic copolymer segments formed from one or more different hydrophobic polymers; where a, b, x, y and z represent the number of units in each hydrophilic ($Hi_1$ and $Hi_2$) and/or hydrophobic (Ho) segment, with each of a, b and y being independently selected from an integer in the range of about 2 to about 5,000, while each of x and z are independently selected from an integer in the range of 1 to about 5,000; where each R is independently selected from linear $C_1$ to $C_{10}$ alkyl groups, substituted linear $C_1$ to $C_{10}$ alkyl groups, branched $C_3$ to $C_{10}$ alkyl groups, or substituted branched $C_3$ to $C_{10}$ alkyl groups, where the one or more substituents on any substituted group are selected from HS—, S, —CN, O, N, —$NH_3$, —$C_6H_5$, P, —OH, —S(CS)S—, —S(CS)O—, —S(CS)N, or a halogen; and where at least one of the hydrophilic ($Hi_1$ and $Hi_2$) and/or hydrophobic (Ho) segments contain at least one crosslinkable and/or polymerizable moiety.

DETAILED DISCLOSURE OF THE INVENTION

Figure 1:
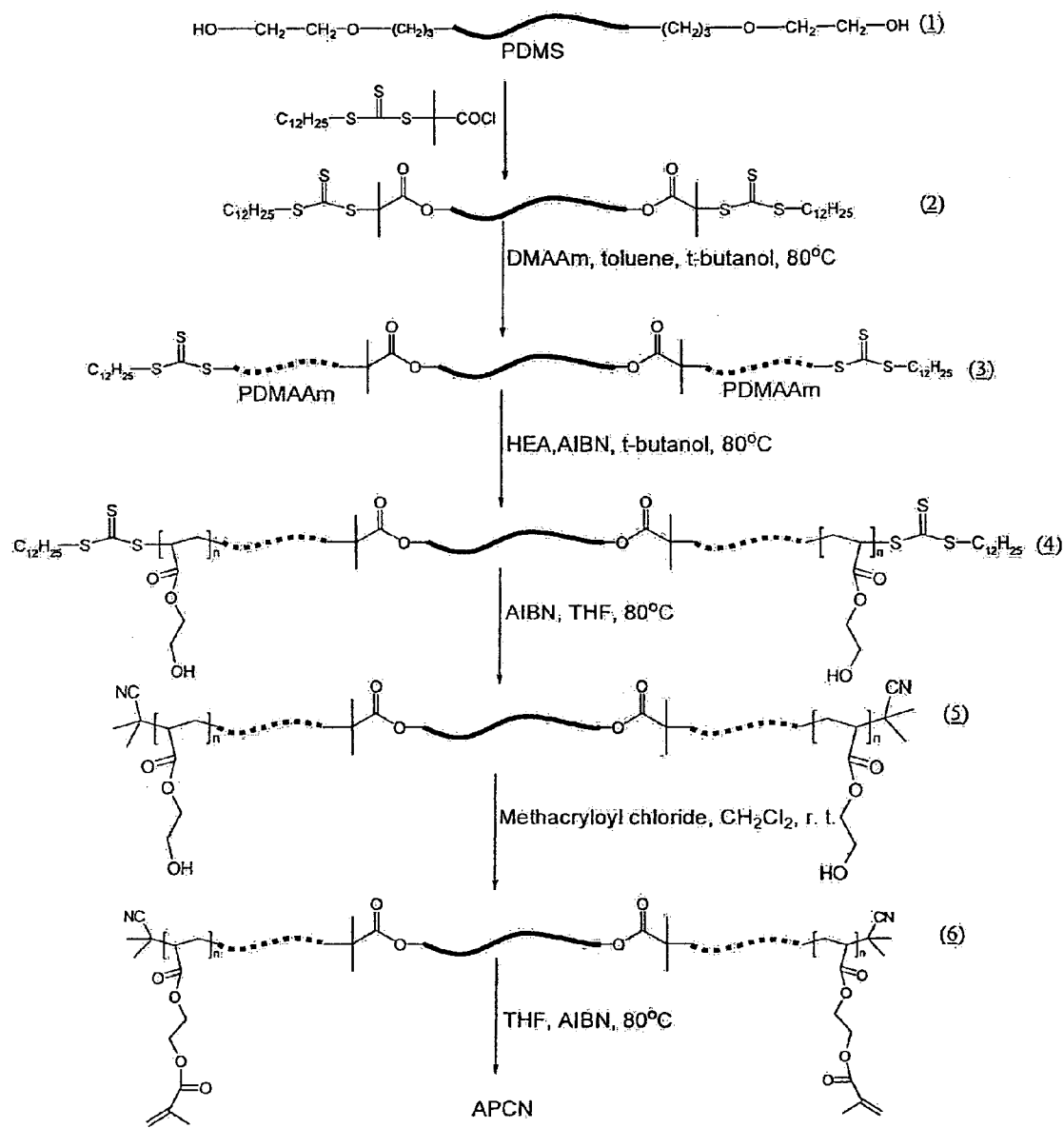
FIG. 1 is an illustration of a synthesis scheme detailing the synthesis of an amphiphilic network and/or co-network according to one embodiment of the present invention.

The present invention relates to the production of amphiphilic copolymer networks, or co-networks, and to methods for preparing amphiphilic co-networks. Furthermore, the present invention relates to products and/or films made from the amphiphilic co-networks produced in accordance with the synthesis methods of the present invention. In one embodiment, the present invention is related to crosslinkable and/or polymerizable compositions that can be utilized to form amphiphilic co-networks, where such compositions are block copolymer compositions that are formed from the combination of at least one hydrophilic segment, at least one hydrophobic segment, and at least one crosslinkable and/or polymerizable segment. In another embodiment, the present invention relates to crosslinkable and/or polymerizable compositions that can be utilized to form amphiphilic co-networks, where the compositions are block copolymer compositions that are formed from at least one hydrophilic segment and at least two hydrophobic segments, with at least one of the hydrophilic or hydrophobic segments being crosslinkable and/or polymerizable. In still another embodiment, the crosslinkable and/or polymerizable block copolymer compositions of the present invention comprise at least five polymer blocks with the five or more polymer blocks alternating between hydrophilic and hydrophobic blocks. In yet another embodiment, the present invention relates to amphiphilic co-networks that are optically clear and highly oxyphilic.

As used herein, the term "polymer block" (or "block") or "polymer blocks" (or "blocks") means a polymer segment having two or more repeating units. As is noted above, the present invention relates to, in one embodiment, amphiphilic co-networks (APCNs). As is known to those of skill in the art, the properties of APCNs are controlled, in part, by the nature and length of the hydrophobic and hydrophilic segments between the crosslinking sites, ($M_{c,Ho}$ and $M_{c,Hi}$, respectively) and by the domain morphology of the network. Bicontinuous domain morphology is of particular importance for extended wear soft contact lens (EWSCL) use. Modern EWSCLs are typically silicone hydrogels, i.e., water-swellable co-networks containing polydimethylsiloxane (PDMS) segments and various hydrophilic segments. Such silicone hydrogels are usually obtained by crosslinking methacrylate (MA) telechelic PDMS in combination with a hydrophilic polymer segment or amphiphilic block copolymers.

The synthesis of EWSCLs is a formidable macromolecular engineering undertaking. Because these "networks" are placed directly onto the cornea, they must be bio-acceptable in the ocular environment. Also, they must exhibit a combination of properties such as, rapid simultaneous permeation of both hydrophilic and hydrophobic molecules, high water uptake combined with appropriate mechanical properties, optically-clear colorless membranes that are rubbery and slippery. Such a combination of properties is, in most instances, mutually exclusive.

In one embodiment, crosslinkable and/or polymerizable compositions for use in forming APCNs are formed from the combination of one or more hydrophilic polymer segments, one or more hydrophobic polymer segments and one or more crosslinkable and/or polymerizable segments. In one instance, the combination of one or more hydrophilic polymer segments, one or more hydrophobic polymer segments and one or more crosslinkable and/or polymerizable segments are all arranged in a single main backbone structure. Such an arrangement having a single main backbone can further have, or lack, side chains. Included in the definition of "side chains" are side chain polymer segments, side alkyl chains or side allyl groups.

In another embodiment, crosslinkable and/or polymerizable compositions for use in forming APCNs are formed from one or more hydrophilic polymer segments in combination with two or more hydrophobic polymer segments. In one embodiment, if two or more hydrophilic polymer segments are present in the crosslinkable and/or polymerizable compositions of the present invention, such segments can be two or more discrete hydrophilic polymer segments. In this embodiment, such hydrophilic polymer segments can be formed from the same or different hydrophilic polymers. Regarding the two or more hydrophobic polymer segments of the present invention, such segments can be two or more discrete hydrophobic polymer segments. In this embodiment, such hydrophobic polymer segments can be formed from the same or different hydrophobic polymers.

Suitable polymer compositions for use as the hydrophilic segment, or segments, of the crosslinkable and/or polymerizable compositions of the present invention include, but are not limited to, one or more polyacrylamides, one or more polyhydroxy methacrylates (e.g., poly(hydroxy ethyl methacrylate)), one or more poly(alkyl)acrylic acids (e.g., polyacrylic acid or polymethacrylic acid), one or more polyallylamines, one or more polyalkylene glycols (e.g., a polyethylene glycol), one or more poly(4-vinylpyridines), one or more polyvinyl pyrrolidones, one or more polyvinyl alcohols, suitable copolymers of the aforementioned polymer compositions, or suitable combinations of any two or more thereof.

Suitable polymer compositions for use as the hydrophobic segment, or segments, of the crosslinkable and/or polymerizable compositions of the present invention include, but are not limited to, one or more polysiloxanes (e.g., polydialkylsiloxanes), one or more polypropylenes, one or more polyisobutylenes, one or more perfluorinated ethers (e.g., Fomblins), one or more poly(allyl alkylacrylates) (e.g., a poly(allyl methacrylate)), one or more poly(hexafluoropropylene oxides), one or more poly(methyl vinyl ethers), one or more poly(perfluoropropylene oxide-co-perfluoroformaldehyde)s, one or more poly(alkylene glycol) alkylacrylates (e.g., a poly (propylene glycol) methacrylate), one or more poly(vinylidene fluoride)s, one or more poly(4-vinylphenols), one or more poly(4-vinylpyridine-co-styrene)s, one or more polylactides, one or more polycaprolactones, one or more polydioxan-2-ones, one or more polylactic-co-glycolides, one or more polylactic-co-dioxan-2-ones, one or more polylactic-co-caprolactones, one or more polyglycolic-co-caprolacton, suitable copolymers of the aforementioned polymer compositions, or suitable combinations of any two or more thereof.

In another embodiment, the polymer compositions for use as the hydrophobic segment, or segments, of the crosslinkable and/or polymerizable compositions of the present invention include, but are not limited to, polymers compositions that are both hydrophobic and oxophilic. Examples of such hydrophobic and oxophilic polymers include, but are not limited to, polydialkylsiloxanes and siloxanes according to the Formula shown below:

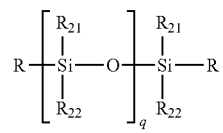

where each R is independently selected from linear $C_1$ to $C_{10}$ alkyl groups, substituted linear $C_1$ to $C_{10}$ alkyl groups, branched $C_3$ to $C_{10}$ alkyl groups, or substituted branched $C_3$ to $C_{10}$ alkyl groups, where the one or more substituents on any substituted group are selected from HS—, S, —CN, O, N, —NH$_3$, —C$_6$H$_5$, P, —OH, —S(CS)S—, —S(CS)O—, —S(CS)N, or a halogen; where each $R_{22}$ is independently selected from hydrogen, linear $C_1$ to $C_{10}$ alkyl groups, branched $C_3$ to $C_{10}$ alkyl groups, a moiety having one or more ethylene oxide units and 2 to 20 carbon atoms, a di-glycol moiety that contains from 4 to about 20 carbon atoms, an ether moiety that contains from about 4 to about 20 carbon atoms, a partially or fully halogenated ether moiety that contains from about 4 to about 20 carbon atoms, or a siloxy silane moiety according to the formula shown below:

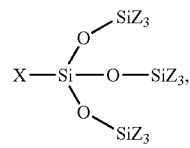

where X is a linear or branched $C_1$ to $C_{10}$ alkyl group, a linear or branched $C_2$ to $C_{10}$ alkenyl group, a linear or branched $C_2$ to $C_{10}$ alkynyl group, and where each Z is independently selected from a linear or branched $C_1$ to $C_{20}$ alkyl group, a linear or branched $C_2$ to $C_{20}$ alkenyl group, a linear or branched $C_2$ to $C_{10}$ alkynyl group; and where q is equal to an integer in the range of about 2 to about 5,000, or from about 5 to about 3,500, or from about 10 to about 2,500, or from about 25 to about 1,000, or even from about 40 to about 500. Here, as well as elsewhere in the specification and claims, individual range limits may be combined. In another embodiment, each of the $R_{22}$s is —CH$_2$—CH$_2$—CH$_2$—O—CH$_2$—CF$_2$—CF$_2$—CF$_2$—CF$_2$H.

In the case where one or more crosslinkable and/or polymerizable segments are present such crosslinkable and/or polymerizable segments can be selected from one or more acrylate groups, one or more methacrylate groups, one or more alkyl acrylate groups, one or more allyl groups, one or more diene groups, or suitable combinations of two or more thereof. In another embodiment, the crosslinkable and/or polymerizable segment of the present invention can be selected from one or more acrylate groups, one or more methacrylate groups, one or more alkyl acrylate groups having between 3 and about 15 carbon atoms, or one or more allyl groups having between 3 and about 15 carbon atoms, one or more diene groups having 3 to about 15 carbon atoms, or suitable combinations of two or more thereof. In another embodiment, the crosslinkable and/or polymerizable segment can also be referred to as a crosslinkable and/or polymerizable moiety. In one embodiment, the crosslinkable and/or polymerizable compositions of the present invention are crosslinked and/or polymerized into APCNs due to the presence of at least one crosslinkable and/or polymerizable segment and/or moiety within the one or more hydrophilic and/or one or more hydrophobic polymer segments present within the present invention's crosslinkable and/or polymerizable compositions.

In another embodiment, the present invention relates to crosslinkable and/or polymerizable compositions formed from a combination of at least one polyacrylamide segment (e.g., a polydimethyl acrylamide (PDMAAm)), at least one polysiloxane segment (e.g., di-hydroxyl terminated polydimethylsiloxane (PDMS)) and at least one crosslinkable segment and/or moiety. In one such instance of this embodiment, the combination of the one or more polyacrylamide segments, the one or more polysiloxane segments and the one or more crosslinkable and/or polymerizable segments are all arranged in a single main backbone structure.

In still another embodiment, the present invention relates to crosslinkable and/or polymerizable compositions formed from a combination of at least one polyacrylamide segment (e.g., a polydimethyl acrylamide (PDMAAm) such as N,N-dimethyl acrylamide), at least one poly(allyl alkylacrylate) segment (e.g., poly(allyl methacrylate)), and at least one polysiloxane segment (e.g., di-hydroxyl terminated polydimethylsiloxane (PDMS)), where the at least one poly(allyl alkylacrylate) segment acts as the crosslinkable and/or polymerizable segment. In one such instance of this embodiment, the combination of the one or more polyacrylamide segments, the one or more polysiloxane segments and the one or more poly(allyl alkylacrylate) segments are all arranged in a single main backbone structure, where the one or more poly(allyl alkylacrylate) segments act as the crosslinkable and/or polymerizable segments.

In one embodiment, the crosslinkable and/or polymerizable compositions of the present invention are used to create various APCNs. However, as is mentioned above the present invention is not limited to just this embodiment. Instead, as will be explained in further detail below, crosslinkable and/or polymerizable compositions for a wide range of applications can be formed from various combinations of the hydrophilic polymers, the hydrophobic polymers and, if needed, the crosslinkable and/or polymerizable segments or moieties listed above. In another embodiment, the combination of the various elements of the present invention disclosed herein are selected so as to yield optically clear APCNs for use in soft contact lenses, where such APCNs possess high oxygen permeability, chemical stability and biocompatibility.

In still another embodiment, the present invention relates to a process for forming APCNs from amphiphilic multiblocks fitted with allyl termini. In this instance, the allyl terminated amphiphilic multiblocks are desirable intermediates for the preparation of APCNs because the allyl group can be crosslinked and/or polymerized by various methods (e.g., hydrosilation, free radical and coupling). In another instance, the present invention relates to amphiphilic pre-polymers with short blocks of terminal allyl groups that are desirable for their efficiency and rate of crosslinking and/or polymerization.

Various embodiments of the present invention will now be discussed in detail below. It should be noted however that the present invention is not limited to just the arrangements shown below. Rather, the present invention is to be broadly construed given the discussion contained herein.

In general the crosslinkable and/or polymerizable block copolymer compositions of the present invention can be generically represented by Formula (I) shown below:

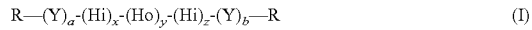

where (Hi) represents a hydrophilic segment and (Ho) represents a hydrophobic segment; where x, y and z represent the number of repeating units in each hydrophilic (Hi) and/or hydrophobic (Ho) segment, with each of x, y and z being independently selected from an integer in the range of about 2 to about 5,000; where each Y is independently selected from acrylate, methacrylate, an alkyl acrylate having between 3 and about 15 carbon atoms, or an allyl group having between 3 and about 15 carbon atoms; where a and b represent the number of Y units in Formula (I), with each of a and b being independently selected from an integer in the range of 0 to about 12, with the proviso that a and b can not both be equal to zero; and where each R is independently selected from linear $C_1$ to $C_{10}$ alkyl groups, substituted linear $C_1$ to $C_{10}$ alkyl groups, branched $C_3$ to $C_{10}$ alkyl groups, or substituted branched $C_3$ to $C_{10}$ alkyl groups, where the one or more substituents on any substituted group are selected from HS—, S, —CN, O, N, —$NH_3$, —$C_6H_5$, P, —OH, —S(CS)S—, —S(CS)O—, —S(CS)N, or a halogen.

In another embodiment, each of x, y and z are independently selected from an integer in the range of about 5 to about 3,500, or from about 10 to about 2,500, or from about 25 to about 1,000, or even from about 40 to about 500. Here, as well as elsewhere in the specification and claims, individual range limits may be combined. Additionally, it should be noted that the present invention is not limited to polymers having the above-mentioned number of repeating units. Instead, the crosslinkable and/or polymerizable block copolymer compositions of the present invention can, in one embodiment, utilize any suitable combination of hydrophilic and hydrophobic polymers having any number of repeating units so long as such compositions can form amphiphilic co-networks.

In another embodiment, each of a and b are independently selected from an integer in the range of 0 to about 8, or even 0 to about 5, again with the proviso that a and b can not both be equal to zero. In another embodiment, each R is independently selected from linear $C_1$ to $C_6$ alkyl groups, substituted linear $C_1$ to $C_6$ alkyl groups, branched $C_3$ to $C_6$ alkyl groups, or substituted branched $C_3$ to $C_6$ alkyl groups, where the one or more substituents on any substituted group are selected from HS—, S, —CN, O, N, —$NH_3$, —$C_6H_5$, P, —OH, —S(CS)S—, —S(CS)O—, —S(CS)N, or a halogen. In another embodiment, each R is independently selected from linear $C_1$ to $C_4$ alkyl groups, substituted linear $C_1$ to $C_4$ alkyl groups, branched $C_3$ to $C_4$ alkyl groups, or substituted branched $C_3$ to $C_4$ alkyl groups, where the substituents of such groups are as noted above.

In still another embodiment, the present invention relates to a crosslinkable and/or polymerizable block copolymer compositions that can be generically represented by Formula (II) shown below:

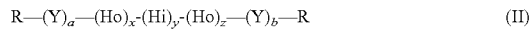

where (Hi) represents a hydrophilic segment and (Ho) represents a hydrophobic segment; where x, y and z represent the number of repeating units in each hydrophilic (Hi) and/or hydrophobic (Ho) segment, with each of x, y and z being independently selected from an integer in the range of about 2 to about 5,000; where each Y is independently selected from acrylate, methacrylate, an alkyl acrylate having between 3 and about 15 carbon atoms, or an allyl group having between 3 and about 15 carbon atoms; where a and b represent the number of Y units in Formula (II), with each of a and b being independently selected from an integer in the range of 0 to about 12, with the proviso that a and b can not both be equal to zero; and where each R is independently selected from linear $C_1$ to $C_{10}$ alkyl groups, substituted linear $C_1$ to $C_{10}$ alkyl groups, branched $C_3$ to $C_{10}$ alkyl groups, or substituted branched $C_3$ to $C_{10}$ alkyl groups, where the one or more substituents on any substituted group are selected from HS—, S, —CN, O, N, —$NH_3$, —$C_6H_5$, P, —OH, —S(CS)S—, —S(CS)O—, —S(CS)N, or a halogen.

In another embodiment, each of x, y and z are independently selected from an integer in the range of about 5 to about 3,500, or from about 10 to about 2,500, or from about 25 to about 1,000, or even from about 40 to about 500. Here, as well as elsewhere in the specification and claims, individual range limits may be combined. Additionally, it should be noted that the present invention is not limited to polymers having the above-mentioned number of repeating units. Instead, the crosslinkable and/or polymerizable block copolymer compositions of the present invention can, in one embodiment, utilize any suitable combination of hydrophilic and hydrophobic polymers having any number of repeating units so long as such compositions can form amphiphilic co-networks.

In another embodiment, each of a and b are independently selected from an integer in the range of 0 to about 8, or even 0 to about 5, again with the proviso that a and b can not both be equal to zero. In another embodiment, each R is independently selected from linear $C_1$ to $C_6$ alkyl groups, substituted linear $C_1$ to $C_6$ alkyl groups, branched $C_3$ to $C_6$ alkyl groups, or substituted branched $C_3$ to $C_6$ alkyl groups, where the one or more substituents on any substituted group are selected from HS—, S, —CN, O, N, —$NH_3$, —$C_6H_5$, P, —OH, —S(CS)S—, —S(CS)O—, —S(CS)N, or a halogen. In another embodiment, each R is independently selected from linear $C_1$ to $C_4$ alkyl groups, substituted linear $C_1$ to $C_4$ alkyl groups, branched $C_3$ to $C_4$ alkyl groups, or substituted branched $C_3$ to $C_4$ alkyl groups, where the substituents of such groups are as noted above.

In still another embodiment, the present invention relates to a crosslinkable and/or polymerizable block copolymer compositions that can be generically represented by Formula (III) shown below:

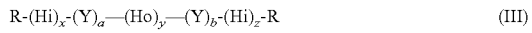

$$R\text{-}(Hi)_x\text{-}(Y)_a\text{—}(Ho)_y\text{—}(Y)_b\text{-}(Hi)_z\text{-}R \qquad (III)$$

where (Hi) represents a hydrophilic segment and (Ho) represents a hydrophobic segment; where x, y and z represent the number of repeating units in each hydrophilic (Hi) and/or hydrophobic (Ho) segment, with each of x, y and z being independently selected from an integer in the range of about 2 to about 5,000; where each Y is independently selected from acrylate, methacrylate, an alkyl acrylate having between 3 and about 15 carbon atoms, or an allyl group having between 3 and about 15 carbon atoms; where a and b represent the number of Y units in Formula (III), with each of a and b being independently selected from an integer in the range of 0 to about 12, with the proviso that a and b can not both be equal to zero; and where each R is independently selected from linear $C_1$ to $C_{10}$ alkyl groups, substituted linear $C_1$ to $C_{10}$ alkyl groups, branched $C_3$ to $C_{10}$ alkyl groups, or substituted branched $C_3$ to $C_{10}$ alkyl groups, where the one or more substituents on any substituted group are selected from HS—, S, —CN, O, N, —$NH_3$, —$C_6H_5$, P, —OH, —S(CS)S—, —S(CS)O—, —S(CS)N, or a halogen.

In another embodiment, each of x, y and z are independently selected from an integer in the range of about 5 to about 3,500, or from about 10 to about 2,500, or from about 25 to about 1,000, or even from about 40 to about 500. It should be noted that the present invention is not limited to polymers having the above-mentioned number of repeating units. Instead, the crosslinkable and/or polymerizable block copolymer compositions of the present invention can, in one embodiment, utilize any suitable combination of hydrophilic and hydrophobic polymers having any number of repeating units so long as such compositions can, in one embodiment, form amphiphilic co-networks.

In another embodiment, each of a and b are independently selected from an integer in the range of 0 to about 8, or even 0 to about 5, again with the proviso that a and b can not both be equal to zero. In another embodiment, each R is independently selected from linear $C_1$ to $C_6$ alkyl groups, substituted linear $C_1$ to $C_6$ alkyl groups, branched $C_3$ to $C_6$ alkyl groups, or substituted branched $C_3$ to $C_6$ alkyl groups, where the one or more substituents on any substituted group are selected from HS—, S, —CN, O, N, —$NH_3$, —$C_6H_5$, P, —OH, —S(CS)S—, —S(CS)O—, —S(CS)N, or a halogen. In another embodiment, each R is independently selected from linear $C_1$ to $C_4$ alkyl groups, substituted linear $C_1$ to $C_4$ alkyl groups, branched $C_3$ to $C_4$ alkyl groups, or substituted branched $C_3$ to $C_4$ alkyl groups, where the substituents of such groups are as noted above.

In still another embodiment, the present invention relates to a crosslinkable and/or polymerizable block copolymer compositions that can be generically represented by Formula (IV) shown below:

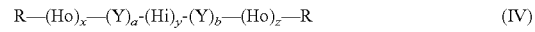

$$R\text{—}(Ho)_x\text{—}(Y)_a\text{-}(Hi)_y\text{-}(Y)_b\text{—}(Ho)_z\text{—}R \qquad (IV)$$

where (Hi) represents a hydrophilic segment and (Ho) represents a hydrophobic segment; where x, y and z represent the number of repeating units in each hydrophilic (Hi) and/or hydrophobic (Ho) segment, with each of x, y and z being independently selected from an integer in the range of about 2 to about 5,000; where each Y is independently selected from acrylate, methacrylate, an alkyl acrylate having between 3 and about 15 carbon atoms, or an allyl group having between 3 and about 15 carbon atoms; where a and b represent the number of Y units in Formula (IV), with each of a and b being independently selected from an integer in the range of 0 to about 12, with the proviso that a and b can not both be equal to zero; and where each R is independently selected from linear $C_1$ to $C_{10}$ alkyl groups, substituted linear $C_1$ to $C_{10}$ alkyl groups, branched $C_3$ to $C_{10}$ alkyl groups, or substituted branched $C_3$ to $C_{10}$ alkyl groups, where the one or more substituents on any substituted group are selected from HS—, S, —CN, O, N, —$NH_3$, —$C_6H_5$, P, —OH, —S(CS)S—, —S(CS)O—, —S(CS)N, or a halogen.

In another embodiment, each of x, y and z are independently selected from an integer in the range of about 5 to about 3,500, or from about 10 to about 2,500, or from about 25 to about 1,000, or even from about 40 to about 500. It should be noted that the present invention is not limited to polymers having the above-mentioned number of repeating units. Instead, the crosslinkable and/or polymerizable block copolymer compositions of the present invention can, in one embodiment, utilize any suitable combination of hydrophilic and hydrophobic polymers having any number of repeating units so long as such compositions can form amphiphilic co-networks.

In another embodiment, each of a and b are independently selected from an integer in the range of 0 to about 8, or even 0 to about 5, again with the proviso that a and b can not both be equal to zero. In another embodiment, each R is independently selected from linear $C_1$ to $C_6$ alkyl groups, substituted linear $C_1$ to $C_6$ alkyl groups, branched $C_3$ to $C_6$ alkyl groups, or substituted branched $C_3$ to $C_6$ alkyl groups, where the one or more substituents on any substituted group are selected from HS—, S, —CN, O, N, —NH$_3$, —C$_6$H$_5$, P, —OH, —S(CS)S—, —S(CS)O—, —S(CS)N, or a halogen. In another embodiment, each R is independently selected from linear $C_1$ to $C_4$ alkyl groups, substituted linear $C_1$ to $C_4$ alkyl groups, branched $C_3$ to $C_4$ alkyl groups, or substituted branched $C_3$ to $C_4$ alkyl groups, where the substituents of such groups are as noted above.

In general the crosslinkable and/or polymerizable block copolymer compositions of the present invention can be generically represented by Formula (V) shown below:

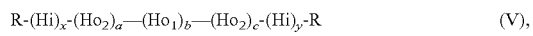

R-(Hi)$_x$-(Ho$_2$)$_a$—(Ho$_1$)$_b$—(Ho$_2$)$_c$-(Hi)$_y$-R     (V), where (Hi) represents hydrophilic segments formed from one or more hydrophilic polymers; where (Ho$_1$) and (Ho$_2$) represent hydrophobic segments formed from two or more different hydrophobic polymers; where a, b, c, x and y represent the number of units in each hydrophilic (Hi) and/or hydrophobic (Ho$_1$ and Ho$_2$) segment, with each of a, b and c being independently selected from an integer in the range of about 2 to about 5,000, while each of x and y are independently selected from an integer in the range of 1 to about 5,000; where each R is independently selected from linear $C_1$ to $C_{10}$ alkyl groups, substituted linear $C_1$ to $C_{10}$ alkyl groups, branched $C_3$ to $C_{10}$ alkyl groups, or substituted branched $C_3$ to $C_{10}$ alkyl groups, where the one or more substituents on any substituted group are selected from HS—, S, —CN, O, N, —NH$_3$, —C$_6$H$_5$, P, —OH, —S(CS)S—, —S(CS)O—, —S(CS)N, or a halogen; and where at least one of the hydrophilic (Hi) and/or hydrophobic (Ho$_1$ and Ho$_2$) segments contain at least one crosslinkable and/or polymerizable moiety.

In another embodiment, each of a, b, c, x and y are independently selected from an integer in the range of about 5 to about 3,500, or from about 10 to about 2,500, or from about 25 to about 1,000, or even from about 40 to about 500. Here, as well as elsewhere in the specification and claims, individual range limits may be combined. Additionally, it should be noted that the present invention is not limited to polymers having the above-mentioned number of repeating units. Instead, the crosslinkable and/or polymerizable block copolymer compositions of the present invention can, in one embodiment, utilize any suitable combination of hydrophilic and hydrophobic polymers having any number of repeating units so long as such compositions can form amphiphilic co-networks.

In another embodiment, each R is independently selected from linear $C_1$ to $C_6$ alkyl groups, substituted linear $C_1$ to $C_6$ alkyl groups, branched $C_3$ to $C_6$ alkyl groups, or substituted branched $C_3$ to $C_6$ alkyl groups, where the one or more substituents on any substituted group are selected from HS—, S, —CN, O, N, —NH$_3$, —C$_6$H$_5$, P, —OH, —S(CS)S—, —S(CS)O—, —S(CS)N, or a halogen. In another embodiment, each R is independently selected from linear $C_1$ to $C_4$ alkyl groups, substituted linear $C_1$ to $C_4$ alkyl groups, branched $C_3$ to $C_4$ alkyl groups, or substituted branched $C_3$ to $C_4$ alkyl groups, where the substituents of such groups are as noted above.

In still another embodiment, the present invention relates to a crosslinkable and/or polymerizable block copolymer compositions that can be generically represented by Formula (VI) shown below:

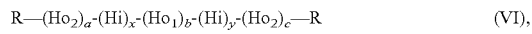

R—(Ho$_2$)$_a$-(Hi)$_x$-(Ho$_1$)$_b$-(Hi)$_y$-(Ho$_2$)$_c$—R     (VI), where (Hi) represents hydrophilic segments formed from one or more hydrophilic polymers; where (Ho$_1$) and (Ho$_2$) represent hydrophobic segments formed from two or more different hydrophilic polymers; where a, b, c, x and y represent the number of units in each hydrophilic (Hi) and/or hydrophobic (Ho$_1$ and Ho$_2$) segment, with each of b, x and y being independently selected from an integer in the range of about 2 to about 5,000, while each of a and c are independently selected from an integer in the range of 1 to about 5,000; where each R is independently selected from linear $C_1$ to $C_{10}$ alkyl groups, substituted linear $C_1$ to $C_{10}$ alkyl groups, branched $C_3$ to $C_{10}$ alkyl groups, or substituted branched $C_3$ to $C_{10}$ alkyl groups, where the one or more substituents on any substituted group are selected from HS—, S, —CN, O, N, —NH$_3$, —C$_6$H$_5$, P, —OH, —S(CS)S—, —S(CS)O—, —S(CS)N, or a halogen, or a halogen; and where at least one of the hydrophilic (Hi) and/or hydrophobic (Ho$_1$ and Ho$_2$) segments contain at least one crosslinkable and/or polymerizable moiety.

In another embodiment, each of a, b, c, x and y are independently selected from an integer in the range of about 5 to about 3,500, or from about 10 to about 2,500, or from about 25 to about 1,000, or even from about 40 to about 500. It should be noted that the present invention is not limited to polymers having the above-mentioned number of repeating units. Instead, the crosslinkable and/or polymerizable block copolymer compositions of the present invention can, in one embodiment, utilize any suitable combination of hydrophilic and hydrophobic polymers having any number of repeating units so long as such compositions can form amphiphilic co-networks.

In another embodiment, each R is independently selected from linear $C_1$ to $C_6$ alkyl groups, substituted linear $C_1$ to $C_6$ alkyl groups, branched $C_3$ to $C_6$ alkyl groups, or substituted branched $C_3$ to $C_6$ alkyl groups, where the one or more substituents on any substituted group are selected from HS—, S, —CN, O, N, —NH$_3$, —C$_6$H$_5$, P, —OH, —S(CS)S—, —S(CS)O—, —S(CS)N, or a halogen. In another embodiment, each R is independently selected from linear $C_1$ to $C_4$ alkyl groups, substituted linear $C_1$ to $C_4$ alkyl groups, branched $C_3$ to $C_4$ alkyl groups, or substituted branched $C_3$ to $C_4$ alkyl groups, where the substituents of such groups are as noted above.

In still another embodiment, the present invention relates to a crosslinkable and/or polymerizable block copolymer compositions that can be generically represented by Formula (VII) shown below:

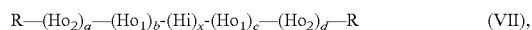

R—(Ho$_2$)$_a$—(Ho$_1$)$_b$-(Hi)$_x$-(Ho$_1$)$_c$—(Ho$_2$)$_d$—R     (VII), where (Hi) represents hydrophilic segments formed from one or more hydrophilic polymers; where (Ho$_1$) and (Ho$_2$) represent hydrophobic segments formed from two or more different hydrophobic polymers; where a, b, c, d and x represent the number of units in each hydrophilic (Hi) and/or hydrophobic (Ho$_1$ and Ho$_2$) segment, with each of b, c and x being independently selected from an integer in the range of about 2 to about 5,000, while each of a and d are independently selected from an integer in the range of 1 to about 5,000; where each R is independently selected from linear $C_1$ to $C_{10}$ alkyl groups, substituted linear $C_1$ to $C_{10}$ alkyl groups, branched $C_3$ to $C_{10}$ alkyl groups, or substituted branched $C_3$ to $C_{10}$ alkyl groups, where the one or more substituents on any substituted group are selected from HS—, S, —CN, O, N, —NH₃, —C₆H₅, P, —OH, —S(CS)S—, —S(CS)O—, —S(CS)N, or a halogen; and where at least one of the hydrophilic (Hi) and/or hydrophobic (Ho₁ and Ho₂) segments contain at least one crosslinkable and/or polymerizable moiety.

In another embodiment, each of a, b, c, d and x are independently selected from an integer in the range of about 5 to about 3,500, or from about 10 to about 2,500, or from about 25 to about 1,000, or even from about 40 to about 500. It should be noted that the present invention is not limited to polymers having the above-mentioned number of repeating units. Instead, the crosslinkable and/or polymerizable block copolymer compositions of the present invention can, in one embodiment, utilize any suitable combination of hydrophilic and hydrophobic polymers having any number of repeating units so long as such compositions can form amphiphilic co-networks.

In another embodiment, each R is independently selected from linear $C_1$ to $C_6$ alkyl groups, substituted linear $C_1$ to $C_6$ alkyl groups, branched $C_3$ to $C_6$ alkyl groups, or substituted branched $C_3$ to $C_6$ alkyl groups, where the one or more substituents on any substituted group are selected from HS—, S, —CN, O, N, —NH₃, —C₆H₅, P, —OH, —S(CS)S—, —S(CS)O—, —S(CS)N, or a halogen. In another embodiment, each R is independently selected from linear $C_1$ to $C_4$ alkyl groups, substituted linear $C_1$ to $C_4$ alkyl groups, branched $C_3$ to $C_4$ alkyl groups, or substituted branched $C_3$ to $C_4$ alkyl groups, where the substituents of such groups are as noted above.

In still another embodiment, the present invention relates to a crosslinkable and/or polymerizable block copolymer compositions that can be generically represented by Formula (VIII) shown below:

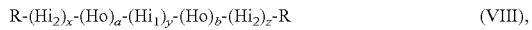

$$R\text{-}(Hi_2)_x\text{-}(Ho)_a\text{-}(Hi_1)_y\text{-}(Ho)_b\text{-}(Hi_2)_z\text{-}R \qquad (VIII),$$

where ($Hi_1$) and ($Hi_2$) represent hydrophilic segments formed from two or more hydrophilic polymers; where (Ho) represents hydrophobic segments formed from one or more different hydrophobic polymers; where a, b, x, y and z represent the number of units in each hydrophilic ($Hi_1$ and/or $Hi_2$) and/or hydrophobic (Ho) segment, with each of a, b and y being independently selected from an integer in the range of about 2 to about 5,000, while each of x and z are independently selected from an integer in the range of 1 to about 5,000; where each R is independently selected from linear $C_1$ to $C_{10}$ alkyl groups, substituted linear $C_1$ to $C_{10}$ alkyl groups, branched $C_3$ to $C_{10}$ alkyl groups, or substituted branched $C_3$ to $C_{10}$ alkyl groups, where the one or more substituents on any substituted group are selected from HS—, S, —CN, O, N, —NH₃, —C₆H₅, P, —OH, —S(CS)S—, —S(CS)O—, —S(CS)N, or a halogen; and where at least one of the hydrophilic ($Hi_1$ and/or $Hi_2$) and/or hydrophobic (Ho) segments contain at least one crosslinkable and/or polymerizable moiety.

In another embodiment, each of a, b, x, y and z are independently selected from an integer in the range of about 5 to about 3,500, or from about 10 to about 2,500, or from about 25 to about 1,000, or even from about 40 to about 500. It should be noted that the present invention is not limited to polymers having the above-mentioned number of repeating units. Instead, the crosslinkable and/or polymerizable block copolymer compositions of the present invention can, in one embodiment, utilize any suitable combination of hydrophilic and hydrophobic polymers having any number of repeating units so long as such compositions can form amphiphilic co-networks.

In another embodiment, each R is independently selected from linear $C_1$ to $C_6$ alkyl groups, substituted linear $C_1$ to $C_6$ alkyl groups, branched $C_3$ to $C_6$ alkyl groups, or substituted branched $C_3$ to $C_6$ alkyl groups, where the one or more substituents on any substituted group are selected from HS—, S, —CN, O, N, —NH₃, —C₆H₅, P, —OH, —S(CS)S—, —S(CS)O—, —S(CS)N, or a halogen. In another embodiment, each R is independently selected from linear $C_1$ to $C_4$ alkyl groups, substituted linear $C_1$ to $C_4$ alkyl groups, branched $C_3$ to $C_4$ alkyl groups, or substituted branched $C_3$ to $C_4$ alkyl groups, where the substituents of such groups are as noted above.

As would be apparent to those of skill in the art, the hydrophilic segments, the hydrophobic segments and, if present, the crosslinkable and/or polymerizable segments (or moieties) in Formulas (I) through (VIII) are selected from any suitable combination of the hydrophilic polymers, the hydrophobic polymers, or the crosslinkable and/or polymerizable segments (or moieties) discussed above.

In another embodiment, the present invention relates to copolymer compositions that are formed from various combinations of two or more hydrophilic ($Hi_1$ and $Hi_2$) segments with one or more hydrophobic (Ho) segment. Such possible combinations include copolymer compositions with segments similar to Formulas (IV) and (VII) above except for the fact that the hydrophilic and hydrophobic segments are reversed. That is, in each of Formulas (IV) and (VIII) each (Hi) segment is a (Ho) segment, and each (Ho) segment a (Hi) segment. Thus the resulting combinations could be arranged as follows: (a) R-(Ho)-($Hi_2$)-($Hi_1$)-($Hi_2$)-(Ho)-R; and (b) R-($Hi_2$)-($Hi_1$)-(Ho)-($Hi_1$)-($Hi_2$)-R. Note that the repeating unit variables are excluded from the copolymer compositions above for ease of reference as the number of units in each segment is the same as defined above with regard to Formulas (IV) through (VIII).

Given the above discussion, the present invention is not limited to just the arrangements of hydrophilic (Hi) segments and hydrophobic (Ho) segments shown above. Rather, a wide range of possible combinations is possible depending upon the exact number of hydrophilic (Hi) segments and hydrophobic (Ho) segments contained within a composition formed in accordance with the method of the present invention.

Additionally, in another embodiment, the "end" hydrophilic (Hi) groups or hydrophobic (Ho) groups of the compositions discussed in Formulas (IV) through (VIII) above can be a group formed from a single polymer unit (i.e., the embodiment where each "end" (Hi) group or (Ho) group variable is equal to 1). In such a case, these "end" hydrophilic (Hi) groups or hydrophobic (Ho) groups can be formed from the respective monomers of the aforementioned polymers. It should be noted that this alternative embodiment applies to any of the polymer compositions disclosed for use in conjunction with the present invention.

Regarding the method by which compositions in accordance with the present invention are formed, in one embodiment the compositions of the present invention are formed by a RAFT polymerization process. In one case, a suitable RAFT polymerization process can be accomplished by functionalizing the middle hydrophilic (Hi) or hydrophobic (Ho) segment with a suitable reversible addition fragmentation (RAFT) chain transfer agent (CTA)). Suitable reversible addition fragmentation (RAFT) chain transfer agents (CTAs) are known in the art and include, but are not limited to, the trithiocarbonate group shown in Reaction Scheme of FIG. 5, dithioesters, dithiocarbamates, and xanthates.

As is discussed above, the crosslinkable and/or polymerizable block copolymer compositions of the present invention contain one or more hydrophilic segments, one or more hydrophobic segments and one or more crosslinkable and/or polymerizable segments (or moieties) that can be used to form amphiphilic co-networks. In another embodiment, the crosslinkable and/or polymerizable block copolymer compositions of the present invention contain one or more hydrophilic segments and two or more hydrophobic segments that can be used to form amphiphilic co-networks, where the at least one of the hydrophilic segments or hydrophobic segments is crosslinkable and/or polymerizable. In another embodiment, the crosslinkable and/or polymerizable block copolymer compositions of the present invention contain two or more hydrophilic segments and one or more hydrophobic segments that can be used to form amphiphilic co-networks, where the at least one of the hydrophilic segments or hydrophobic segments is crosslinkable and/or polymerizable. As will be discussed below in more detail, one or more amphiphilic co-networks in accordance with the present invention are achieved by causing at least one crosslinkable and/or polymerizable block copolymer composition in accordance with Formulas (I) through (VIII) to undergo crosslinking and/or polymerization, where such crosslinking and/or polymerization is initiated by at least one initiator compound, at least one type of light, and/or heat.

Polymers for Embodiments with One or More Crosslinkable and/or Polymerizable Groups Y:

As is discussed above, the crosslinkable and/or polymerizable block copolymer compositions of the present invention contain, in one embodiment, at least one hydrophilic polymer segment, at least one hydrophobic polymer segment and at least one crosslinkable and/or polymerizable segment (or moiety).

The following discussion relates to the above-mentioned crosslinkable and/or polymerizable compositions and discusses functionalized polymer sub-compositions that in combination, as is detailed below with regard to Reaction Scheme of FIG. 1, form the crosslinkable and/or polymerizable block copolymer compositions of the present invention. As is discussed above, the present invention is not limited solely to the following polymer compositions. Rather, the present invention is to be broadly construed in light of the discussion contained above as it relates to the polymer segments, and compositions formed from such polymer segments, suitable for use in conjunction with the present invention.

In one embodiment, the present invention utilizes a combination of at least one polyacrylamide (e.g., a polydimethyl acrylamide (PDMAAm)), at least one di-hydroxyl terminated polysiloxane (e.g., polydimethylsiloxane (PDMS)) and at least one crosslinkable and/or polymerizable segment/moiety (e.g., an acrylate, methacrylate, or alkyl acrylate having between 3 and about 15 carbon atoms) to form amphiphilic co-networks. In such an embodiment, the at least one polyacrylamide (e.g., a polydimethyl acrylamide (PDMAAm)) polymer functions as the hydrophilic polymer segment, while the at least one di-hydroxyl terminated polysiloxane polymer functions as the hydrophobic polymer segment in a suitably formed amphiphilic co-network. In another embodiment, a derivative of the at least one di-hydroxyl terminated polysiloxane polymer functions as the hydrophobic polymer segment in a suitably formed amphiphilic co-network. In one instance, each polymer used to form the amphiphilic co-networks of the present invention independently have from about 5 to about 5,000 repeating polymer units, or from about 10 to about 2,500 repeating polymer units, or from about 25 to about 1,000 repeating polymer units, or even from about 40 to about 500 repeating polymer units.

It should be noted that the present invention is not limited to polymers having the above-mentioned number of repeating units. Instead, the crosslinkable and/or polymerizable block copolymer compositions of the present invention can, in one embodiment, utilize any suitable combination of hydrophilic and hydrophobic polymers having any number of repeating units so long as such compositions can form amphiphilic co-networks. Another consideration that needs to be taken into account when choosing the polymers used to form the crosslinkable and/or polymerizable block copolymer compositions of the present invention is the intended use for the one or more amphiphilic co-networks that are to be formed therefrom. For example, if the amphiphilic co-network is going to be formed into a film to be used as a contact lens, then the polymers used in the present invention should at a minimum yield optically transparent amphiphilic co-networks. As would be apparent to one of ordinary skill in the art, depending upon the desired use for the amphiphilic co-networks of the present invention, one may have to take into consideration a wide variety of physical, chemical and/or mechanical properties of the polymers used to form such networks.

In another embodiment, where the crosslinkable and/or polymerizable block copolymer compositions of the present invention are generically represented by Formula (I) shown below:

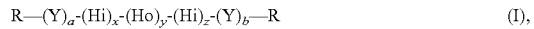

$$R-(Y)_a-(Hi)_x-(Ho)_y-(Hi)_z-(Y)_b-R \qquad (I),$$

such crosslinkable and/or polymerizable block copolymers are formed from a combination of at least one polydialkyl acrylamide polymer with at least one polydimethylsiloxane polymer via the Reaction Scheme detailed in FIG. 1. Exemplary polydialkyl acrylamide (e.g., polydimethyl acrylamide (PDMAAm)) and polydimethylsiloxane polymers (e.g., di-hydroxyl terminated polydimethylsiloxane are shown below in Formulas (IX) and (X), respectively. The compounds according to Formula (IX) can be represented as follows:

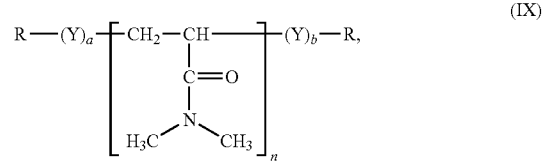

where each R is independently selected from linear $C_1$ to $C_{10}$ alkyl groups, substituted linear $C_1$ to $C_{10}$ alkyl groups, branched $C_3$ to $C_{10}$ alkyl groups, or substituted branched $C_3$ to $C_{10}$ alkyl groups, where the one or more substituents on any substituted group are selected from HS—, S, —CN, O, N, —NH$_3$, —C$_6$H$_5$, P, —OH, —S(CS)S—, —S(CS)O—, —S(CS)N, or a halogen; where each Y is independently selected from acrylate, methacrylate, an alkyl acrylate having between 3 and about 15 carbon atoms, or an allyl group having between 3 and about 15 carbon atoms; where a and b represent the number of Y units in Formula (III), with each of a and b being independently selected from an integer in the range of 0 to about 12, with the proviso that a and b can not both be equal to zero; and where n is equal to an integer in the range of about 2 to about 5,000.

In another embodiment, each R is independently selected from linear $C_1$ to $C_6$ alkyl groups, substituted linear $C_1$ to $C_6$ alkyl groups, branched $C_3$ to $C_6$ alkyl groups, or substituted branched $C_3$ to $C_6$ alkyl groups, where the one or more substituents on any substituted group are selected from HS—, S, —CN, O, N, —NH$_3$, —C$_6$H$_5$, P, —OH, —S(CS)S—, —S(CS)O—, —S(CS)N, or a halogen. In another embodiment, each R is independently selected from linear C$_1$ to C$_4$ alkyl groups, substituted linear C$_1$ to C$_4$ alkyl groups, branched C$_3$ to C$_4$ alkyl groups, or substituted branched C$_3$ to C$_4$ alkyl groups, with the substituents of such groups are as noted above. In another embodiment, each of a and b are independently selected from an integer in the range of 0 to about 8, or even 0 to about 5, again with the proviso that a and b can not both be equal to zero.

In another embodiment, n is selected from an integer in the range of about 5 to about 3,500, or from about 10 to about 2,500, or from about 25 to about 1,000, or even from about 40 to about 500. It should be noted that the present invention is not limited to polymers having the above-mentioned number of repeating units. Instead, the crosslinkable and/or polymerizable block copolymer compositions of the present invention can, in one embodiment, utilize any suitable combination of hydrophilic and hydrophobic polymers having any number of repeating units so long as such compositions can form amphiphilic co-networks.

The compounds according to Formula (X) can be represented as follows:

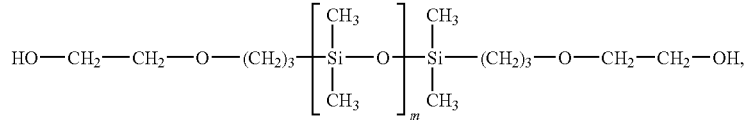

where m is equal to an integer in the range of about 2 to about 5,000, or from about 5 to about 3,500, or from about 10 to about 2,500, or from about 25 to about 1,000, or even from about 40 to about 500. It should be noted that the present invention is not limited to just the polyacrylamide and polydimethylsiloxane polymers of Formulas (IX) and (X). Rather, in this embodiment any suitable combination of polydialkyl acrylamide and di-hydroxyl terminated polydimethylsiloxane polymers can be used.

The polydimethylsiloxane polymer of Formula (X) can, for example, be purchased from Gelest, Tulleytown, Pa. Alternatively, if so desired, the polymer of Formula (X) could be synthesized from a corresponding vinyl terminated polymer such as the one shown below:

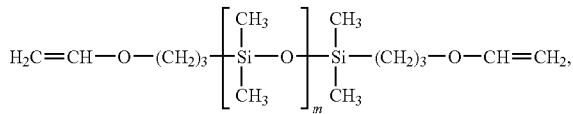

thereby permitting one to control the number of repeating units present in the polymer of Formula (X).

With regard to the polymer of Formula (IX), this polymer can be polymerized, as is known in the art, from a suitable dimethyl acrylamide (DMAAm) monomer which is available from Aldrich.

In another embodiment, where the crosslinkable and/or polymerizable block copolymer compositions of the present invention are generically represented by Formula (I) shown below:

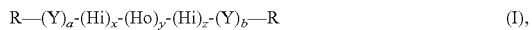

such crosslinkable and/or polymerizable block copolymers are formed from a combination of at least one polydialkyl acrylamide polymer with at least one polydimethylsiloxane polymer via the Reaction Scheme detailed in FIG. 1. Exemplary polydialkyl acrylamide (e.g., polydimethyl acrylamide (PDMAAm)) and polydimethylsiloxane polymers (e.g., di-hydroxyl terminated polydimethylsiloxane) are shown below in Formulas (V) and (VI), respectively. The compounds according to Formula (V) can be represented as follows:

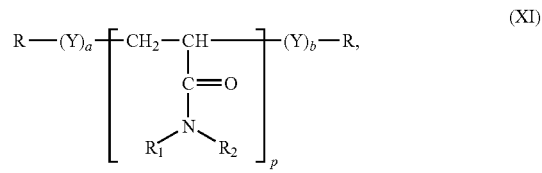

where each R is independently selected from linear C$_1$ to C$_{10}$ alkyl groups, substituted linear C$_1$ to C$_{10}$ alkyl groups, branched C$_3$ to C$_{10}$ alkyl groups, or substituted branched C$_3$ to C$_{10}$ alkyl groups, where the one or more substituents on any substituted group are selected from HS—, S, —CN, O, N, —NH$_3$, —C$_6$H$_5$, P, —OH, —S(CS)S—, —S(CS)O—, —S(CS)N, or a halogen; where each Y is independently selected from acrylate, methacrylate, an alkyl acrylate having between 3 and about 15 carbon atoms, or an allyl group having between 3 and about 15 carbon atoms; where a and b represent the number of Y units in Formula (XI), with each of a and b being independently selected from an integer in the range of 0 to about 12, with the proviso that a and b can not both be equal to zero; where R$_1$ and R$_2$ are independently selected from linear C$_1$ to C$_{10}$ alkyl groups or branched C$_3$ to C$_{10}$ alkyl groups; and where p is equal to an integer in the range of about 2 to about 5,000.

In another embodiment, each R is independently selected from linear C$_1$ to C$_6$ alkyl groups, substituted linear C$_1$ to C$_6$ alkyl groups, branched C$_3$ to C$_6$ alkyl groups, or substituted branched C$_3$ to C$_6$ alkyl groups, where the one or more substituents on any substituted group are selected from HS—, S, —CN, O, N, —NH$_3$, —C$_6$H$_5$, P, —OH, —S(CS)S—, —S(CS)O—, —S(CS)N, or a halogen. In another embodiment, each R is independently selected from linear C$_1$ to C$_4$ alkyl groups, substituted linear C$_1$ to C$_4$ alkyl groups, branched C$_3$ to C$_4$ alkyl groups, or substituted branched C$_3$ to C$_4$ alkyl groups, with the substituents of such groups are as noted above. In another embodiment, each of a and b are independently selected from an integer in the range of 0 to about 8, or even 0 to about 5, again with the proviso that a and b can not both be equal to zero.

In another embodiment, R$_1$ and R$_2$ are independently selected from linear C$_1$ to C$_6$ alkyl groups or branched C$_3$ to C$_6$ alkyl groups, or even linear C$_1$ to C$_4$ alkyl groups or branched C$_3$ to C$_4$ alkyl groups. In still another embodiment, R$_1$ and R$_2$ are identical substituent groups (e.g., all methyl groups, all propyl groups or all butyl groups).

In another embodiment, p is selected from an integer in the range of about 5 to about 3,500, or from about 10 to about 2,500, or from about 25 to about 1,000. It should be noted that the present invention is not limited to polymers having the above-mentioned number of repeating units. Instead, the crosslinkable and/or polymerizable block copolymer compositions of the present invention can, in one embodiment, utilize any suitable combination of hydrophilic and hydrophobic polymers having any number of repeating units so long as such compositions can form amphiphilic co-networks.

In this embodiment, the at least one di-hydroxyl terminated polysiloxane polymer utilized in the present invention can be selected from any polymer according to Formula (XII) shown below:

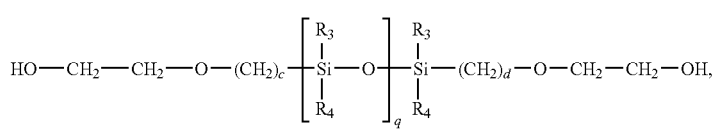

where q is equal to an integer in the range of about 2 to about 5,000, or from about 5 to about 3,500, or from about 10 to about 2,500, or from about 25 to about 1,000, or even from about 40 to about 500; where c and d are independently selected from an integer in the range of 1 to about 10, or from 1 to about 7, or even from 1 to about 5; and where $R_3$ and $R_4$ are independently selected from linear $C_1$ to $C_{10}$ alkyl groups or branched $C_3$ to $C_{10}$ alkyl groups. In another embodiment, $R_3$ and $R_4$ are independently selected from linear $C_1$ to $C_6$ alkyl groups or branched $C_3$ to $C_6$ alkyl groups, or even linear $C_1$ to $C_4$ alkyl groups or branched $C_3$ to $C_4$ alkyl groups. In another embodiment, a compound according to Formula (VI) can be a vinyl terminated polymer rather than the di-hydroxyl terminated polymer as is shown above. In still another embodiment, $R_3$ and $R_4$ are identical substituent groups (e.g., all methyl groups, all propyl groups or all butyl groups).

In one embodiment, an intermediate composition derived from the combination of one or more hydrophilic polymer and the one or more hydrophobic polymer, as detailed in the Reaction Scheme of FIG. 1, is shown in the Formula below:

where each R, Y, a and b are independently defined as stated above; where each Q is independently selected from a linear or branched $C_1$ to $C_{20}$ alkyl group, or a linear or branched $C_2$ to $C_{10}$ alkyl group, or even a linear or branched $C_2$ to $C_6$ alkyl group; where PDMAAm represents the repeating hydrophilic polymer segments based on a polydimethyl acrylamide polymer with the number of repeating units defined as discussed above; and where PDMS represents the repeating hydrophobic polymer segments based on a polydimethylsiloxane polymer with the number of repeating units defined as discussed above.

Turning to the embodiment where the crosslinkable and/or polymerizable block copolymers of the present invention are generically represented by Formula (II) shown below:

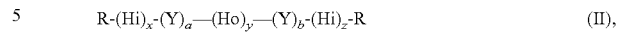

such crosslinkable and/or polymerizable block copolymers are formed from a combination of at least one polydialkyl acrylamide polymer with at least one polydimethylsiloxane polymer via the Reaction Scheme detailed in FIG. 1. Exemplary polydialkyl acrylamide (e.g., polydimethyl acrylamide (PDMAAm)) and polydialkylsiloxane polymers (e.g., polydimethylsiloxane) are shown below in Formulas (XIII) and (XIV), respectively. The compounds according to Formula (XIII) can be represented as follows:

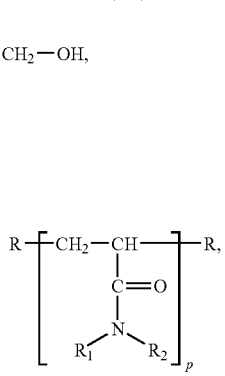

where each R is independently selected from linear $C_1$ to $C_{10}$ alkyl groups, substituted linear $C_1$ to $C_{10}$ alkyl groups, branched $C_3$ to $C_{10}$ alkyl groups, or substituted branched $C_3$ to $C_{10}$ alkyl groups, where the one or more substituents on any substituted group are selected from HS—, S, —CN, O, N, —NH$_3$, —C$_6$H$_5$, P, —OH, —S(CS)S—, —S(CS)O—, —S(CS)N, or a halogen; where $R_1$ and $R_2$ are independently selected from linear $C_1$ to $C_{10}$ alkyl groups or branched $C_3$ to $C_{10}$ alkyl groups; and where p is equal to an integer in the range of about 2 to about 5,000.

In another embodiment, each R is independently selected from linear $C_1$ to $C_6$ alkyl groups, substituted linear $C_1$ to $C_6$ alkyl groups, branched $C_3$ to $C_6$ alkyl groups, or substituted branched $C_3$ to $C_6$ alkyl groups, where the one or more substituents on any substituted group are selected from HS—, S, —CN, O, N, —NH$_3$, —C$_6$H$_5$, P, —OH, —S(CS)S—, —S(CS)O—, —S(CS)N, or a halogen. In another embodiment, each R is independently selected from linear $C_1$ to $C_4$ alkyl groups, substituted linear $C_1$ to $C_4$ alkyl groups, branched $C_3$ to $C_4$ alkyl groups, or substituted branched $C_3$ to $C_4$ alkyl groups, with the substituents of such groups are as noted above. In another embodiment, each of a and b are independently selected from an integer in the range of 0 to about 8, or even 0 to about 5, again with the proviso that a and b can not both be equal to zero.

In another embodiment, $R_1$ and $R_2$ are independently selected from linear $C_1$ to $C_6$ alkyl groups or branched $C_3$ to $C_6$ alkyl groups, or even linear $C_1$ to $C_4$ alkyl groups or branched $C_3$ to $C_4$ alkyl groups. In still another embodiment, $R_1$ and $R_2$ are identical substituent groups (e.g., all methyl groups, all propyl groups or all butyl groups).

In another embodiment, p is selected from an integer in the range of about 5 to about 3,500, or from about 10 to about 2,500, or from about 25 to about 1,000, or even from about 40 to about 500. It should be noted that the present invention is not limited to polymers having the above-mentioned number of repeating units. Instead, the crosslinkable and/or polymerizable block copolymer compositions of the present invention can, in one embodiment, utilize any suitable combination of hydrophilic and hydrophobic polymers having any number of repeating units so long as such compositions can form amphiphilic co-networks.

The compound according to Formula (XIV) can be represented as follows:

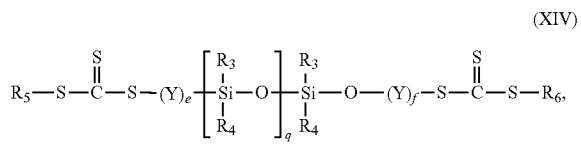
(XIV)

where $R_5$ and $R_6$ are independently selected from linear $C_1$ to $C_{30}$ alkyl groups, substituted linear $C_1$ to $C_{30}$ alkyl groups, branched $C_3$ to $C_{30}$ alkyl groups, or substituted branched $C_3$ to $C_{30}$ alkyl groups, where the one or more substituents on any substituted group are selected from HS—, S, —CN, O, N, —NH$_3$, —C$_6$H$_5$, P, —OH, —S(CS)S—, —S(CS)O—, —S(CS)N, or a halogen; where each Y is independently selected from acrylate, methacrylate, an alkyl acrylate having between 3 and about 15 carbon atoms, or an allyl group having between 3 and about 15 carbon atoms; where e and f represent the number of Y units in Formula (XIV), with each of e and f being independently selected from an integer in the range of 0 to about 12, with the proviso that e and f can not both be equal to zero; where $R_3$ and $R_4$ are independently selected from linear $C_1$ to $C_{10}$ alkyl groups or branched $C_3$ to $C_{10}$ alkyl groups; and where q is equal to an integer in the range of about 2 to about 5,000.

n another embodiment, each $R_5$ and $R_6$ are independently selected from linear $C_1$ to $C_{20}$ alkyl groups, substituted linear $C_1$ to $C_{20}$ alkyl groups, branched $C_3$ to $C_{20}$ alkyl groups, or substituted branched $C_3$ to $C_{20}$ alkyl groups, where the one or more substituents on any substituted group are selected from HS—, S, —CN, O, N, —NH$_3$, —C$_6$H$_5$, P, —OH, —S(CS)S—, —S(CS)O—, —S(CS)N, or a halogen. In another embodiment, each $R_5$ and $R_6$ are independently selected from linear $C_{10}$ to $C_{15}$ alkyl groups, substituted linear $C_{10}$ to $C_{15}$ alkyl groups, branched $C_{10}$ to $C_{15}$ alkyl groups, or substituted branched $C_{10}$ to $C_{15}$ alkyl groups, with the substituents of such groups are as noted above. In another embodiment, each of e and f are independently selected from an integer in the range of 0 to about 8, or even 0 to about 5, again with the proviso that e and f can not both be equal to zero.

In another embodiment, $R_3$ and $R_4$ are independently selected from linear $C_1$ to $C_6$ alkyl groups or branched $C_3$ to $C_6$ alkyl groups, or even linear $C_1$ to $C_4$ alkyl groups or branched $C_3$ to $C_4$ alkyl groups. In another embodiment, a compound according to Formula (XIV) can be a vinyl terminated polymer rather than the hydroxyl terminated polymer as is shown above. In still another embodiment, $R_3$ and $R_4$ are identical substituent groups (e.g., all methyl groups, all propyl groups or all butyl groups). In another embodiment, q is equal to an integer in the range of about 5 to about 3,500, or from about 10 to about 2,500, or from about 25 to about 1,000, or even from about 40 to about 500.

In this embodiment, compounds according to Formula (XIV) can be formed by reacting a compound according to Formula (XII) below with a compound according to Formula (XV) below. The compound according to Formula (XII) is as shown below:

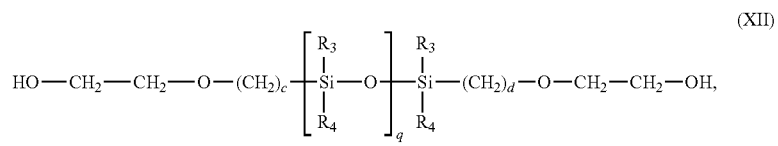
(XII)

where q is equal to an integer in the range of about 2 to about 5,000, or from about 5 to about 3,500, or from about 10 to about 2,500, or from about 25 to about 1,000, or even from about 40 to about 500; where c and d are independently selected from an integer in the range of 1 to about 10, or from 1 to about 7, or even from 1 to about 5; and where $R_3$ and $R_4$ are independently selected from linear $C_1$ to $C_{10}$ alkyl groups or branched $C_3$ to $C_{10}$ alkyl groups. In another embodiment, $R_3$ and $R_4$ are independently selected from linear $C_1$ to $C_6$ alkyl groups or branched $C_3$ to $C_6$ alkyl groups, or even linear $C_1$ to $C_4$ alkyl groups or branched $C_3$ to $C_4$ alkyl groups. In another embodiment, a compound according to Formula (XII) can be a vinyl terminated polymer rather than the hydroxyl terminated polymer as is shown above. In still another embodiment, $R_3$ and $R_4$ are identical substituent groups (e.g., all methyl groups, all propyl groups or all butyl groups).

The compounds according to Formula (XV) are as shown below:

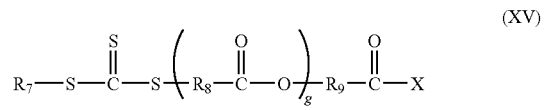
(XV)

where $R_7$ is selected from linear $C_1$ to $C_{30}$ alkyl groups, substituted linear $C_1$ to $C_{30}$ alkyl groups, branched $C_3$ to $C_{30}$ alkyl groups, or substituted branched $C_3$ to $C_{30}$ alkyl groups, where the one or more substituents on any substituted group are selected from HS—, S, —CN, O, N, —$NH_3$, —$C_6H_5$, P, —OH, —S(CS)S—, —S(CS)O—, —S(CS)N, or a halogen; where $R_8$ and $R_9$ are independently selected from an alkyl group having between 2 to about 12 carbon atoms, or a branched alkyl group having between 3 to about 12 carbon atoms; where g is an integer from 0 to about 11; and where X is selected from Cl, F, Br, or I.

In another embodiment, $R_7$ is independently selected from linear $C_1$ to $C_{20}$ alkyl groups, substituted linear $C_1$ to $C_{20}$ alkyl groups, branched $C_3$ to $C_{20}$ alkyl groups, or substituted branched $C_3$ to $C_{20}$ alkyl groups, where the one or more substituents on any substituted group are selected from HS—, S, —CN, O, N, —$NH_3$, —$C_6H_5$, P, —OH, —S(CS)S—, —S(CS)O—, —S(CS)N, or a halogen. In another embodiment, $R_7$ are independently selected from linear $C_{10}$ to $C_{15}$ alkyl groups, substituted linear $C_{10}$ to $C_{15}$ alkyl groups, branched $C_{10}$ to $C_{15}$ alkyl groups, or substituted branched $C_{10}$ to $C_{15}$ alkyl groups, with the substituents of such groups are as noted above. In another embodiment, g is an integer in the range of 0 to about 7, or even 0 to about 4.

As would be understood by those of skill in the art, the reaction of Formula (XII) below with a compound according to Formula (XV) per the Reaction Scheme detailed in FIG. 1, produces a compound according to Formula (XIV) where the $R_7$ group of Formula (XV) is equivalent to the $R_5$ and/or $R_6$ group of Formula (XIV), and where the tail end of Formula (XV) together with the internal oxygen of Formula (XII) form group $(Y)_e$ and/or $(Y)_f$ of Formula (XIV).

Given the compounds disclosed above, one of skill in the art would realize what types of polymer compounds that could be used to form crosslinkable and/or polymerizable compounds in accordance with Formulas (III) and (IV) shown above.

Polymers for Embodiments with One or More Crosslinkable and/or Polymerizable Hydrophilic or Hydrophobic Groups:

As is discussed above, the crosslinkable and/or polymerizable block copolymer compositions of the present invention contain, in one embodiment, at least one hydrophilic polymer segment and at least two different hydrophobic polymer segments, where at least one of the hydrophilic or hydrophobic segment is a crosslinkable and/or polymerizable segment. In another embodiment, the crosslinkable and/or polymerizable block copolymer compositions of the present invention contain at least two different hydrophilic polymer segments and at least one hydrophobic polymer segment, where at least one of the hydrophilic or hydrophobic segments is a crosslinkable and/or polymerizable segment.

The following discussion relates to the above-mentioned crosslinkable and/or polymerizable compositions and discusses functionalized polymer sub-compositions that in combination, as is detailed below with regard to Reaction Scheme of FIG. 5, form the crosslinkable and/or polymerizable block copolymer compositions of the present invention. As is discussed above, the present invention is not limited solely to the following polymer compositions. Rather, the present invention is to be broadly construed in light of the discussion contained above as it relates to the polymer segments, and compositions formed from such polymer segments, suitable for use in conjunction with the present invention.

In another embodiment, the present invention utilizes a combination of at least one polyacrylamide (e.g., a polydim-ethyl acrylamide (PDMAAm)), at least one poly(allyl alkylacrylate) (e.g., poly(allyl methacrylate)), and at least one polysiloxane (e.g., di-hydroxyl terminated polydimethylsiloxane (PDMS)) to form amphiphilic co-networks. In such an embodiment, the at least one polyacrylamide (e.g., a polydimethyl acrylamide (PDMAAm)) polymer function as the hydrophilic polymer segments, while the combination of the at least one poly(allyl alkylacrylate) (e.g., poly(allyl methacrylate) polymer and the at least one polysiloxane (e.g., di-hydroxyl terminated polydimethylsiloxane (PDMS)) polymer function as the hydrophobic polymer segments in a suitably formed amphiphilic co-network. In another embodiment, a derivative of the at least one di-hydroxyl terminated polysiloxane polymer functions as the hydrophobic polymer segment in a suitably formed amphiphilic co-network. In one instance, each polymer used to form the amphiphilic co-networks of the present invention independently have from 2 to about 5,000 repeating polymer units, or from about 5 to about 3,500 repeating polymer units, or from about 10 to about 2,500 repeating polymer units, or from about 25 to about 1,000 repeating polymer units, or even from about 40 to about 500 repeating polymer units.

It should be noted that the present invention is not limited to polymers having the above-mentioned number of repeating units. Instead, the crosslinkable and/or polymerizable block copolymer compositions of the present invention can, in one embodiment, utilize any suitable combination of hydrophilic and hydrophobic polymers having any number of repeating units so long as such compositions can form amphiphilic co-networks. Another consideration that needs to be taken into account when choosing the polymers used to form the crosslinkable and/or polymerizable block copolymer compositions of the present invention is the intended use for the one or more amphiphilic co-networks that are to be formed therefrom. For example, if the amphiphilic co-network is going to be formed into a film to be used as a contact lens, then the polymers used in the present invention should at a minimum yield optically transparent amphiphilic co-networks. As would be apparent to one of ordinary skill in the art, depending upon the desired use for the amphiphilic co-networks of the present invention, one may have to take into consideration a wide variety of physical, chemical and/or mechanical properties of the polymers used to form such networks.

Figure 5:
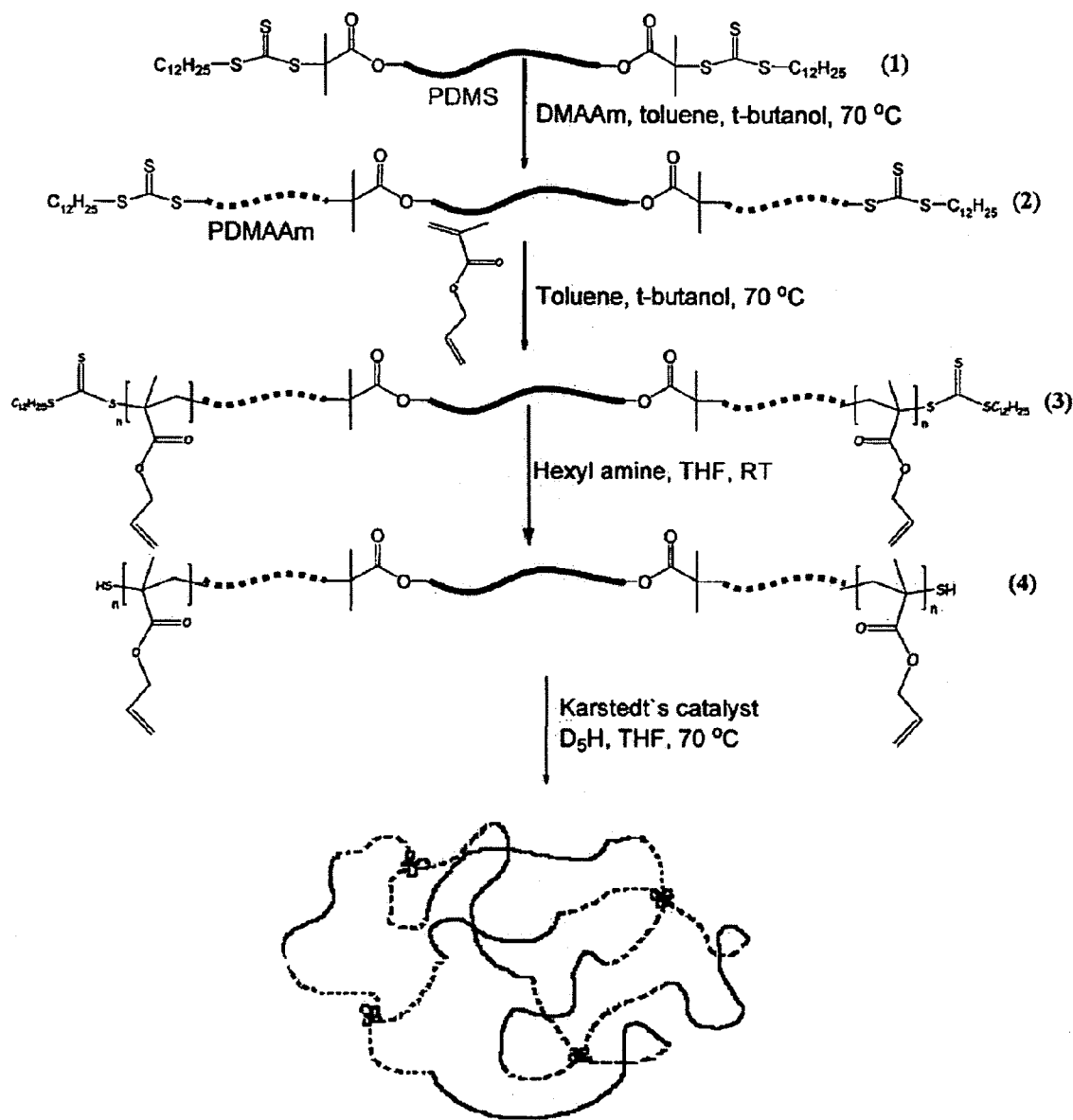
FIG. 5 is an illustration of a synthesis scheme detailing the synthesis of an amphiphilic network and/or co-network according to another embodiment of the present invention.

In another embodiment, where the crosslinkable and/or polymerizable block copolymer compositions of the present invention are generically represented by Formula (V) shown below:

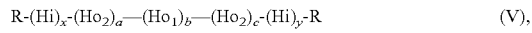

$$R-(Hi)_x-(Ho_2)_a—(Ho_1)_b—(Ho_2)_c-(Hi)_y-R \qquad (V),$$

such crosslinkable and/or polymerizable block copolymers are formed from a combination of at least one polydialkyl acrylamide polymer, at least one poly(allyl alkylacrylate) polymer, and at least one polydimethylsiloxane polymer via a reaction similar in nature to the Reaction Scheme detailed in FIG. 5 where either poly(allyl alkylacrylate) polymer polydimethylsiloxane polymer. Exemplary polydialkyl acrylamide (e.g., polydimethyl acrylamide (PDMAAm)) and poly(allyl alkylacrylate) (e.g., poly(allyl methacrylate)) are shown below in Formulas (XVI) and (XVII), respectively, while an exemplary polydimethylsiloxane polymer (e.g., di-hydroxyl terminated polydimethylsiloxane) is shown below in Formula (XVIII). The compounds according to Formula (XVI) can be represented as follows:

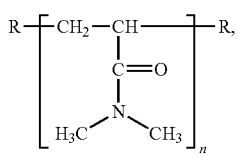
(XVI)

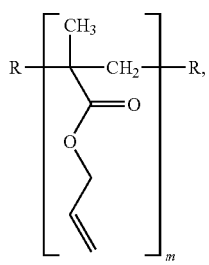
(XVII)

where each R is independently selected from linear $C_1$ to $C_{10}$ alkyl groups, substituted linear $C_1$ to $C_{10}$ alkyl groups, branched $C_3$ to $C_{10}$ alkyl groups, or substituted branched $C_3$ to $C_{10}$ alkyl groups, where the one or more substituents on any substituted group are selected from HS—, S, —CN, O, N, —$NH_3$, —$C_6H_5$, P, —OH, —S(CS)S—, —S(CS)O—, —S(CS)N, or a halogen; and where n is equal to an integer in the range of about 2 to about 5,000.

In another embodiment, each R is independently selected from linear $C_1$ to $C_6$ alkyl groups, substituted linear $C_1$ to $C_6$ alkyl groups, branched $C_3$ to $C_6$ alkyl groups, or substituted branched $C_3$ to $C_6$ alkyl groups, where the one or more substituents on any substituted group are selected from HS—, S, —CN, O, N, —$NH_3$, —$C_6H_5$, P, —OH, —S(CS)S—, —S(CS)O—, —S(CS)N, or a halogen. In another embodiment, each R is independently selected from linear $C_1$ to $C_4$ alkyl groups, substituted linear $C_1$ to $C_4$ alkyl groups, branched $C_3$ to $C_4$ alkyl groups, or substituted branched $C_3$ to $C_4$ alkyl groups, with the substituents of such groups are as noted above.

In another embodiment, n is selected from an integer in the range of about 5 to about 3,500, or from about 10 to about 2,500, or from about 25 to about 1,000, or even from about 40 to about 500. It should be noted that the present invention is not limited to polymers having the above-mentioned number of repeating units. Instead, the crosslinkable and/or polymerizable block copolymer compositions of the present invention can, in one embodiment, utilize any suitable combination of hydrophilic and hydrophobic polymers having any number of repeating units so long as such compositions can form amphiphilic co-networks.

In still another embodiment, the compound shown above in Formula (XVI) has not terminal R groups and instead is just terminated with an end dimethyl acrylamide groups. In one such example of this embodiment, each R is a hydrogen.

The compounds according to Formula (XVII) can be represented as follows:

where each R is independently selected from linear $C_1$ to $C_{10}$ alkyl groups, substituted linear $C_1$ to $C_{10}$ alkyl groups, branched $C_3$ to $C_{10}$ alkyl groups, or substituted branched $C_3$ to $C_{10}$ alkyl groups, where the one or more substituents on any substituted group are selected from HS—, S, —CN, O, N, —$NH_3$, —$C_6H_5$, P, —OH, —S(CS)S—, —S(CS)O—, —S(CS)N, or a halogen; where m is equal to an integer in the range of about 2 to about 5,000; and where $R_1$ is selected from linear or branched $C_1$ to $C_{10}$ alkyl groups.

In another embodiment, each R is independently selected from linear $C_1$ to $C_6$ alkyl groups, substituted linear $C_1$ to $C_6$ alkyl groups, branched $C_3$ to $C_6$ alkyl groups, or substituted branched $C_3$ to $C_6$ alkyl groups, where the one or more substituents on any substituted group are selected from HS—, S, —CN, O, N, —$NH_3$, —$C_6H_5$, P, —OH, —S(CS)S—, —S(CS)O—, —S(CS)N, or a halogen. In another embodiment, each R is independently selected from linear $C_1$ to $C_4$ alkyl groups, substituted linear $C_1$ to $C_4$ alkyl groups, branched $C_3$ to $C_4$ alkyl groups, or substituted branched $C_3$ to $C_4$ alkyl groups, with the substituents of such groups are as noted above.

In another embodiment, m is selected from an integer in the range of about 5 to about 3,500, or from about 10 to about 2,500, or from about 25 to about 1,000, or even from about 40 to about 500. It should be noted that the present invention is not limited to polymers having the above-mentioned number of repeating units. Instead, the crosslinkable and/or polymerizable block copolymer compositions of the present invention can, in one embodiment, utilize any suitable combination of hydrophilic and hydrophobic polymers having any number of repeating units so long as such compositions can form amphiphilic co-networks.

In still another embodiment, the compound shown above in Formula (XVII) has no terminal R groups and instead is just terminated with an end allyl methacrylate groups. In one such example of this embodiment, each R is a hydrogen.

The compounds according to Formula (XVIII) can be represented as follows:

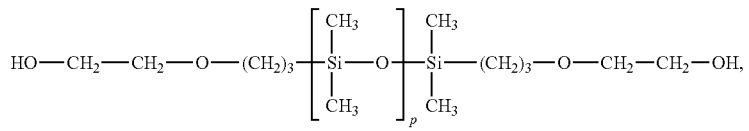
(XVIII)

where p is equal to an integer in the range of about 2 to about 5,000, or from about 5 to about 3,500, or from about 10 to about 2,500, or from about 25 to about 1,000, or even from about 40 to about 500. It should be noted that the present invention is not limited to just the polyacrylamide, poly(allyl alkylacrylate) and polydimethylsiloxane polymers of Formulas (XVI), (XVII) and (XVIII). Rather, in this embodiment any suitable combination of polydialkyl acrylamide and di-hydroxyl terminated polydimethylsiloxane polymers can be used.

The polydimethylsiloxane polymer of Formula (XVIII) can, for example, be purchased from Gelest, Tulleytown, Pa. Alternatively, if so desired, the polymer of Formula (XVIII) could be synthesized from a corresponding vinyl terminated polymer such as the one shown below:

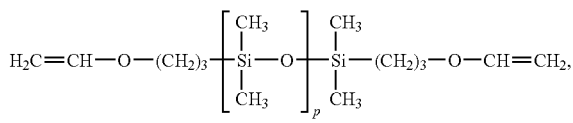

thereby permitting one to control the number of repeating units present in the polymer of Formula (XVIII).

With regard to the polymers of Formulas (XVI) and (XVII), these polymers can be polymerized, as is known in the art, from a suitable dimethyl acrylamide (DMAAm) and allyl methacrylate monomers which are available from Aldrich.

In another embodiment, where the crosslinkable and/or polymerizable block copolymer compositions of the present invention are generically represented by Formula (V) shown below:

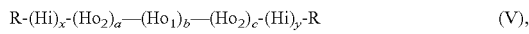

$$R\text{-}(Hi)_x\text{-}(Ho_2)_a\text{-}(Ho_1)_b\text{-}(Ho_2)_c\text{-}(Hi)_y\text{-}R \qquad (V),$$

such crosslinkable and/or polymerizable block copolymers are formed from a combination of at least one polydialkyl acrylamide polymer, at least one poly(allyl alkylacrylate) polymer, and at least one polydimethylsiloxane polymer via a reaction similar in nature to the Reaction Scheme detailed in FIG. 5. Exemplary polydialkyl acrylamide (e.g., polydimethyl acrylamide (PDMAAm)), poly(allyl alkylacrylate) (e.g., poly(allyl methacrylate)) and polydimethylsiloxane polymers (e.g., di-hydroxyl terminated polydimethylsiloxane) are shown below in Formulas (XIX), (XX) and (XXI), respectively. The compounds according to Formula (XIX) can be represented as follows:

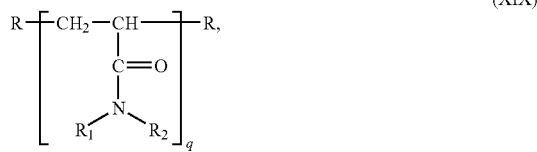

where each R is independently selected from linear $C_1$ to $C_{10}$ alkyl groups, substituted linear $C_1$ to $C_{10}$ alkyl groups, branched $C_3$ to $C_{10}$ alkyl groups, or substituted branched $C_3$ to $C_{10}$ alkyl groups, where the one or more substituents on any substituted group are selected from HS—, S, —CN, O, N, —NH$_3$, —C$_6$H$_5$, P, —OH, —S(CS)S—, —S(CS)O—, —S(CS)N, or a halogen; where $R_1$ and $R_2$ are independently selected from linear $C_1$ to $C_{10}$ alkyl groups or branched $C_3$ to $C_{10}$ alkyl groups; and where q is equal to an integer in the range of about 2 to about 5,000.

In another embodiment, each R is independently selected from linear $C_1$ to $C_6$ alkyl groups, substituted linear $C_1$ to $C_6$ alkyl groups, branched $C_3$ to $C_6$ alkyl groups, or substituted branched $C_3$ to $C_6$ alkyl groups, where the one or more substituents on any substituted group are selected from HS—, S, —CN, O, N, —NH$_3$, —C$_6$H$_5$, P, —OH, —S(CS)S—, —S(CS)O—, —S(CS)N, or a halogen. In another embodiment, each R is independently selected from linear $C_1$ to $C_4$ alkyl groups, substituted linear $C_1$ to $C_4$ alkyl groups, branched $C_3$ to $C_4$ alkyl groups, or substituted branched $C_3$ to $C_4$ alkyl groups, with the substituents of such groups are as noted above.

In another embodiment, $R_1$ and $R_2$ are independently selected from linear $C_1$ to $C_6$ alkyl groups or branched $C_3$ to $C_6$ alkyl groups, or even linear $C_1$ to $C_4$ alkyl groups or branched $C_3$ to $C_4$ alkyl groups. In still another embodiment, $R_1$ and $R_2$ are identical substituent groups (e.g., all methyl groups, all propyl groups or all butyl groups).

In another embodiment, q is selected from an integer in the range of about 5 to about 3,500, or from about 10 to about 2,500, or from about 25 to about 1,000, or even from about 40 to about 500. It should be noted that the present invention is not limited to polymers having the above-mentioned number of repeating units. Instead, the crosslinkable and/or polymerizable block copolymer compositions of the present invention can, in one embodiment, utilize any suitable combination of hydrophilic and hydrophobic polymers having any number of repeating units so long as such compositions can form amphiphilic co-networks.

In still another embodiment, the compound shown above in Formula (XIX) has not terminal R groups and instead is just terminated with an end dimethyl acrylamide groups. In one such example of this embodiment, each R is a hydrogen.

The compounds according to Formula (XX) can be represented as follows:

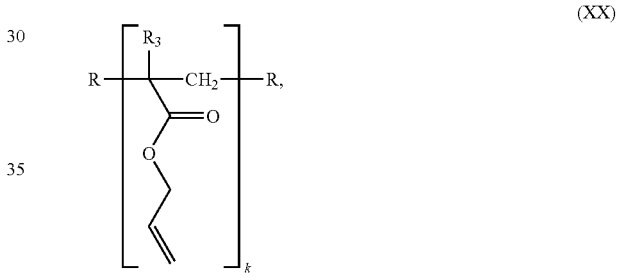

where each R is independently selected from linear $C_1$ to $C_{10}$ alkyl groups, substituted linear $C_1$ to $C_{10}$ alkyl groups, branched $C_3$ to $C_{10}$ alkyl groups, or substituted branched $C_3$ to $C_{10}$ alkyl groups, where the one or more substituents on any substituted group are selected from HS—, S, —CN, O, N, —NH$_3$, —C$_6$H$_5$, P, —OH, —S(CS)S—, —S(CS)O—, —S(CS)N, or a halogen; where k is equal to an integer in the range of about 2 to about 5,000; and where $R_1$ is selected from linear or branched $C_1$ to $C_{10}$ alkyl groups.

In another embodiment, each R is independently selected from linear $C_1$ to $C_6$ alkyl groups, substituted linear $C_1$ to $C_6$ alkyl groups, branched $C_3$ to $C_6$ alkyl groups, or substituted branched $C_3$ to $C_6$ alkyl groups, where the one or more substituents on any substituted group are selected from HS—, S, —CN, O, N, —NH$_3$, —C$_6$H$_5$, P, —OH, —S(CS)S—, —S(CS)O—, —S(CS)N, or a halogen. In another embodiment, each R is independently selected from linear $C_1$ to $C_4$ alkyl groups, substituted linear $C_1$ to $C_4$ alkyl groups, branched $C_3$ to $C_4$ alkyl groups, or substituted branched $C_3$ to $C_4$ alkyl groups, with the substituents of such groups are as noted above.

In another embodiment, k is selected from an integer in the range of about 5 to about 3,500, or from about 10 to about 2,500, or from about 25 to about 1,000, or even from about 40 to about 500. It should be noted that the present invention is not limited to polymers having the above-mentioned number of repeating units. Instead, the crosslinkable and/or polymerizable block copolymer compositions of the present invention can, in one embodiment, utilize any suitable combination of hydrophilic and hydrophobic polymers having any number of repeating units so long as such compositions can form amphiphilic co-networks.

In still another embodiment, the compound shown above in Formula (XX) has no terminal R groups and instead is just terminated with an end allyl methacrylate groups. In one such example of this embodiment, each R is a hydrogen.

In this embodiment, the at least one at least one di-hydroxyl terminated polysiloxane polymer utilized in the present invention can be selected from any polymer according to Formula (XXI) shown below:

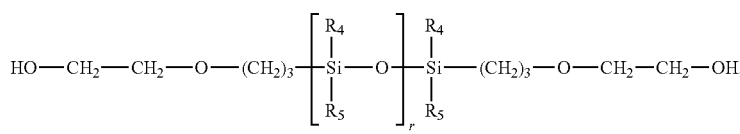

(XXI)

where r is equal to an integer in the range of about 2 to about 5,000, or from about 5 to about 3,500, or from about 10 to about 2,500, or from about 25 to about 1,000, or even from about 40 to about 500; where c and d are independently selected from an integer in the range of 1 to about 10, or from 1 to about 7, or even from 1 to about 5; and where $R_4$ and $R_5$ are independently selected from linear $C_1$ to $C_{10}$ alkyl groups or branched $C_3$ to $C_{10}$ alkyl groups. In another embodiment, $R_4$ and $R_5$ are independently selected from linear $C_1$ to $C_6$ alkyl groups or branched $C_3$ to $C_6$ alkyl groups, or even linear $C_1$ to $C_4$ alkyl groups or branched $C_3$ to $C_4$ alkyl groups. In another embodiment, a compound according to Formula (X) can be a vinyl terminated polymer rather than the di-hydroxyl terminated polymer as is shown above. In still another embodiment, $R_4$ and $R_5$ are identical substituent groups (e.g., all methyl groups, all propyl groups or all butyl groups).

Turning to the embodiment where the crosslinkable and/or polymerizable block copolymers of the present invention are generically represented by Formula (VI) shown below:

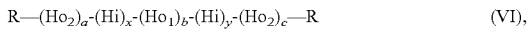

(VI), such crosslinkable and/or polymerizable block copolymers are formed from a combination of at least one polydialkyl acrylamide polymer, at least one poly(allyl alkylacrylate) polymer, and at least one polydimethylsiloxane polymer via the Reaction Scheme detailed in FIG. 5. Exemplary polydialkyl acrylamide (e.g., polydimethyl acrylamide (PD-MAAm)) and poly(allyl alkylacrylate) (e.g., poly(allyl methacrylate)) are shown below in Formulas (XIX) and (XX), respectively, while an exemplary polydimethylsiloxane polymer (e.g., polydimethylsiloxane) is shown below in Formula (XXII). The compounds according to Formula (XIX) can be represented as follows:

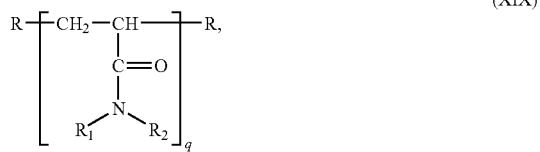

(XIX)

where each R is independently selected from linear $C_1$ to $C_{10}$ alkyl groups, substituted linear $C_1$ to $C_{10}$ alkyl groups, branched $C_3$ to $C_{10}$ alkyl groups, or substituted branched $C_3$ to $C_{10}$ alkyl groups, where the one or more substituents on any substituted group are selected from HS—, S, —CN, O, N, —NH$_3$, —C$_6$H$_5$, P, —OH, —S(CS)S—, —S(CS)O—, —S(CS)N, or a halogen; where $R_1$ and $R_2$ are independently selected from linear $C_1$ to $C_{10}$ alkyl groups or branched $C_3$ to $C_{10}$ alkyl groups; and where q is equal to an integer in the range of about 2 to about 5,000.

In another embodiment, each R is independently selected from linear $C_1$ to $C_6$ alkyl groups, substituted linear $C_1$ to $C_6$ alkyl groups, branched $C_3$ to $C_6$ alkyl groups, or substituted branched $C_3$ to $C_6$ alkyl groups, where the one or more substituents on any substituted group are selected from HS—, S, —CN, O, N, —NH$_3$, —C$_6$H$_5$, P, —OH, —S(CS)S—, —S(CS)O—, —S(CS)N, or a halogen. In another embodiment, each R is independently selected from linear $C_1$ to $C_4$ alkyl groups, substituted linear $C_1$ to $C_4$ alkyl groups, branched $C_3$ to $C_4$ alkyl groups, or substituted branched $C_3$ to $C_4$ alkyl groups, with the substituents of such groups are as noted above.

In another embodiment, $R_1$ and $R_2$ are independently selected from linear $C_1$ to $C_6$ alkyl groups or branched $C_3$ to $C_6$ alkyl groups, or even linear $C_1$ to $C_4$ alkyl groups or branched $C_3$ to $C_4$ alkyl groups. In still another embodiment, $R_1$ and $R_2$ are identical substituent groups (e.g., all methyl groups, all propyl groups or all butyl groups).

In another embodiment, q is selected from an integer in the range of about 5 to about 3,500, or from about 10 to about 2,500, or from about 25 to about 1,000, or even from about 40 to about 500. It should be noted that the present invention is not limited to polymers having the above-mentioned number of repeating units. Instead, the crosslinkable and/or polymerizable block copolymer compositions of the present invention can, in one embodiment, utilize any suitable combination of hydrophilic and hydrophobic polymers having any number of repeating units so long as such compositions can form amphiphilic co-networks.

In still another embodiment, the compound shown above in Formula (XIX) has not terminal R groups and instead is just terminated with an end dimethyl acrylamide groups. In one such example of this embodiment, each R is a hydrogen.

The compounds according to Formula (XX) can be represented as follows:

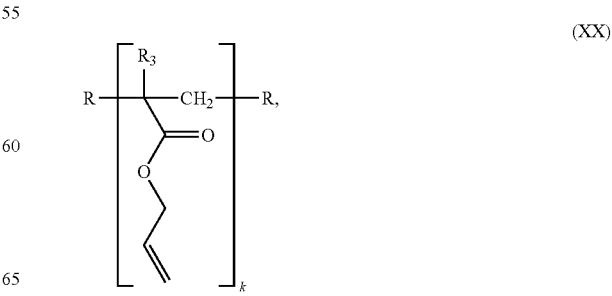

(XX)

where each R is independently selected from linear $C_1$ to $C_{10}$ alkyl groups, substituted linear $C_1$ to $C_{10}$ alkyl groups, branched $C_3$ to $C_{10}$ alkyl groups, or substituted branched $C_3$ to $C_{10}$ alkyl groups, where the one or more substituents on any substituted group are selected from HS—, S, —CN, O, N, —NH$_3$, —C$_6$H$_5$, P, —OH, —S(CS)S—, —S(CS)O—, —S(CS)N, or a halogen; where k is equal to an integer in the range of about 2 to about 5,000; and where $R_3$ is selected from linear or branched $C_1$ to $C_{10}$ alkyl groups.

In another embodiment, each R is independently selected from linear $C_1$ to $C_6$ alkyl groups, substituted linear $C_1$ to $C_6$ alkyl groups, branched $C_3$ to $C_6$ alkyl groups, or substituted branched $C_3$ to $C_6$ alkyl groups, where the one or more substituents on any substituted group are selected from HS—, S, —CN, O, N, —NH$_3$, —C$_6$H$_5$, P, —OH, —S(CS)S—, —S(CS)O—, —S(CS)N, or a halogen. In another embodiment, each R is independently selected from linear $C_1$ to $C_4$ alkyl groups, substituted linear $C_1$ to $C_4$ alkyl groups, branched $C_3$ to $C_4$ alkyl groups, or substituted branched $C_3$ to $C_4$ alkyl groups, with the substituents of such groups are as noted above.

In another embodiment, k is selected from an integer in the range of about 5 to about 3,500, or from about 10 to about 2,500, or from about 25 to about 1,000, or even from about 40 to about 500. It should be noted that the present invention is not limited to polymers having the above-mentioned number of repeating units. Instead, the crosslinkable and/or polymerizable block copolymer compositions of the present invention can, in one embodiment, utilize any suitable combination of hydrophilic and hydrophobic polymers having any number of repeating units so long as such compositions can form amphiphilic co-networks.

In still another embodiment, the compound shown above in Formula (XX) has no terminal R groups and instead is just terminated with an end allyl methacrylate groups. In one such example of this embodiment, each R is a hydrogen.

The compound according to Formula (XXII) can be represented as follows:

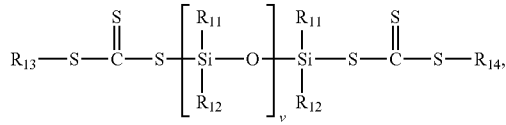

(XXII)

where $R_{13}$ and $R_{14}$ are independently selected from linear $C_1$ to $C_{30}$ alkyl groups, substituted linear $C_1$ to $C_{30}$ alkyl groups, branched $C_3$ to $C_{30}$ alkyl groups, or substituted branched $C_3$ to $C_{30}$ alkyl groups, where the one or more substituents on any substituted group are selected from HS—, S, —CN, O, N, —NH$_3$, —C$_6$H$_5$, P, —OH, —S(CS)S—, —S(CS)O—, —S(CS)N, or a halogen; where $R_{11}$ and $R_{12}$ are independently selected from linear $C_1$ to $C_{10}$ alkyl groups or branched $C_3$ to $C_{10}$ alkyl groups; and where v is equal to an integer in the range of about 2 to about 5,000.

In another embodiment, each $R_{13}$ and $R_{14}$ are independently selected from linear $C_1$ to $C_{20}$ alkyl groups, substituted linear $C_1$ to $C_{20}$ alkyl groups, branched $C_3$ to $C_{20}$ alkyl groups, or substituted branched $C_3$ to $C_{20}$ alkyl groups, where the one or more substituents on any substituted group are selected from HS—, S, —CN, O, N, —NH$_3$, —C$_6$H$_5$, P, —OH, —S(CS)S—, —S(CS)O—, —S(CS)N, or a halogen. In another embodiment, each $R_{13}$ and $R_{14}$ are independently selected from linear $C_{10}$ to $C_{15}$ alkyl groups, substituted linear $C_{10}$ to $C_{15}$ alkyl groups, branched $C_{10}$ to $C_{15}$ alkyl groups, or substituted branched $C_{10}$ to $C_{15}$ alkyl groups, with the substituents of such groups are as noted above. In another embodiment, each of g and h are independently selected from an integer in the range of 0 to about 8, or even 0 to about 5.

In another embodiment, $R_{11}$ and $R_{12}$ are independently selected from linear $C_1$ to $C_6$ alkyl groups or branched $C_3$ to $C_6$ alkyl groups, or even linear $C_1$ to $C_4$ alkyl groups or branched $C_3$ to $C_4$ alkyl groups. In still another embodiment, $R_{11}$ and $R_{12}$ are identical substituent groups (e.g., all methyl groups, all propyl groups or all butyl groups). In another embodiment, v is equal to an integer in the range of about 5 to about 3,500, or from about 10 to about 2,500, or from about 25 to about 1,000, or even from about 40 to about 500.

In this embodiment, compounds according to Formula (XXII) can be formed by reacting a compound according to Formula (XXIII) below with a compound according to Formula (XXIV) below. The compound according to Formula (XXIII) is as shown below:

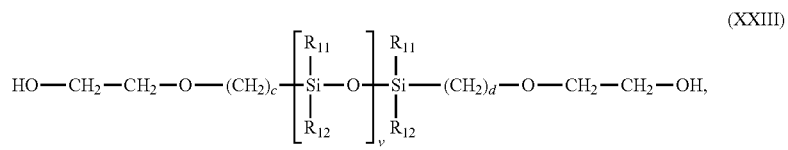

(XXIII)

where v is equal to an integer in the range of about 2 to about 5,000, or from about 5 to about 3,500, or from about 10 to about 2,500, or from about 25 to about 1,000, or even from about 40 to about 500; where c and d are independently selected from an integer in the range of 1 to about 10, or from 1 to about 7, or even from 1 to about 5; and where $R_{11}$ and $R_{12}$ are independently selected from linear $C_1$ to $C_{10}$ alkyl groups or branched $C_3$ to $C_{10}$ alkyl groups. In another embodiment, $R_{11}$ and $R_{12}$ are independently selected from linear $C_1$ to $C_6$ alkyl groups or branched $C_3$ to $C_6$ alkyl groups, or even linear $C_1$ to $C_4$ alkyl groups or branched $C_3$ to $C_4$ alkyl groups. In another embodiment, a compound according to Formula (XXIII) can be a vinyl terminated polymer rather than the hydroxyl terminated polymer as is shown above. In still another embodiment, $R_{11}$ and $R_{12}$ are identical substituent groups (e.g., all methyl groups, all propyl groups or all butyl groups).

The compounds according to Formula (XXIV) are as shown below:

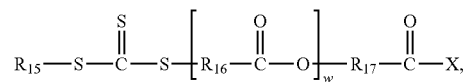

(XXIV)

where $R_{15}$ is selected from linear $C_1$ to $C_{30}$ alkyl groups, substituted linear $C_1$ to $C_{30}$ alkyl groups, branched $C_3$ to $C_{30}$ alkyl groups, or substituted branched $C_3$ to $C_{30}$ alkyl groups, where the one or more substituents on any substituted group are selected from HS—, S, —CN, O, N, —NH$_3$, —C$_6$H$_5$, P, —OH, —S(CS)S—, —S(CS)O—, —S(CS)N, or a halogen; where $R_{16}$ and $R_{17}$ are independently selected from an alkyl group having between 2 to about 12 carbon atoms, or a branched alkyl group having between 3 to about 12 carbon atoms; where w is an integer from 0 to about 11; and where X is selected from Cl, F, Br, or I.

In another embodiment, $R_{15}$ is independently selected from linear $C_1$ to $C_{20}$ alkyl groups, substituted linear $C_1$ to $C_{20}$ alkyl groups, branched $C_3$ to $C_{20}$ alkyl groups, or substituted branched $C_3$ to $C_{20}$ alkyl groups, where the one or more substituents on any substituted group are selected from HS—, S, —CN, O, N, —NH$_3$, —C$_6$H$_5$, P, —OH, —S(CS)S—, —S(CS)O—, —S(CS)N, or a halogen. In another embodiment, $R_{15}$ are independently selected from linear $C_{10}$ to $C_{15}$ alkyl groups, substituted linear $C_{10}$ to $C_{15}$ alkyl groups, branched $C_{10}$ to $C_{15}$ alkyl groups, or substituted branched $C_{10}$ to $C_{15}$ alkyl groups, with the substituents of such groups are as noted above. In another embodiment, w is an integer in the range of 0 to about 7, or even 0 to about 4.

As would be understood by those of skill in the art, the reaction of Formula (XXIII) with a compound according to Formula (XXIV) produces a compound according to Formula (XXII) where the $R_{15}$ group of Formula (XXIV) is equivalent to the $R_{13}$ and/or $R_{14}$ group of Formula (XXII).

In one embodiment the hydrophilic segments of the crosslinkable and/or polymerizable copolymers of the present invention are formed from at least one polyacrylamide (e.g., a polydimethyl acrylamide (PDMAAm)) polymer and the hydrophobic segments of the crosslinkable and/or polymerizable copolymers of the present invention are formed from a combination of at least one poly(allyl alkylacrylate) polymer (e.g., poly(allyl methacrylate)) and at least one polysiloxane polymer (e.g., di-hydroxyl terminated polydimethylsiloxane (PDMS)). This combination yields a crosslinkable and/or polymerizable pentablock composition that can be represented in shorthand as (PAMA-b-PDMAAm-b-PDMS-b-PDMAAm-b-PAMA). Alternatively, in longhand the composition is poly(allyl methacrylate)-b-poly(N,N-dimethyl acrylamide)-b-polydimethylsiloxane-b-poly(N,N-dimethyl acrylamide)-b-poly(allyl methacrylate).

In one embodiment, an intermediate composition derived from the combination of one or more hydrophilic polymer and the one or more hydrophobic polymer, as detailed in the Reaction Scheme of FIG. 1, is shown in the Formula below:

where each $R_6$ and $R_7$ are independently selected from linear $C_1$ to $C_{10}$ alkyl groups, substituted linear $C_1$ to $C_{10}$ alkyl groups, branched $C_3$ to $C_{10}$ alkyl groups, or substituted branched $C_3$ to $C_{10}$ alkyl groups, where the one or more substituents on any substituted group are selected from HS—, S, —CN, O, N, —NH$_3$, —C$_6$H$_5$, P, —OH, —S(CS)S—, —S(CS)O—, —S(CS)N, or a halogen; and where PAMA-b-PDMAAm-b-PDMS-b-PDMAAm-b-PAMA represents the afore-mentioned pentablock polymer segment.

In still another embodiment, the present invention relates to a crosslinkable and/or polymerizable block copolymer compositions that can be generically represented by Formula (VII) shown below:

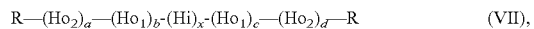

such crosslinkable and/or polymerizable block copolymers are formed from a combination of at least one polydialkyl acrylamide polymer, at least one poly(allyl alkylacrylate) polymer, and at least one polydimethylsiloxane polymer via a reaction similar in nature to the Reaction Scheme detailed in FIG. 5. Exemplary polydialkyl acrylamides (e.g., polydimethyl acrylamide (PDMAAm)) are discussed above in Formulas (XVI) and (XIX), exemplary poly(allyl alkylacrylates) are discussed above in Formulas (XVII) and (XX), and exemplary polysiloxane polymers are discussed above Formulas (XVIII) and (XXI). As is discussed above, the middle (Hi) segment is, in one embodiment, functionalized with a suitable reversible addition fragmentation (RAFT) chain transfer agent (CTA) to permit the formation of a composition in accordance with Formula (VII) above. Given this, one of skill in the art would recognize the suitable combinations of the above polymer compounds that could be used to form crosslinkable and/or polymerizable block copolymers in accordance with Formula (VII).

In another embodiment, compounds in accordance with Formula (VII) can be formed from other suitable combinations of the hydrophilic and hydrophobic compounds discussed above. Accordingly, the compounds in accordance with Formula (VII) are not limited to just the above-mentioned combination.

In still another embodiment, the present invention relates to a crosslinkable and/or polymerizable block copolymer compositions that can be generically represented by Formula (VIII) shown below:

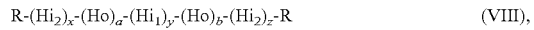

such crosslinkable and/or polymerizable block copolymers are formed from a combination of at least one polydialkyl acrylamide polymer, at least one polyhydroxy methacrylates (e.g., poly(hydroxy ethyl methacrylate)) and at least one polydimethylsiloxane polymer via a reaction similar in nature to the Reaction Scheme detailed in FIG. 5. Exemplary polydialkyl acrylamides (e.g., polydimethyl acrylamide (PDMAAm)) are discussed above in Formulas (XVI) and (XIX), and exemplary polysiloxane polymers are discussed above Formulas (XVIII) and (XXI). As is discussed above, the middle ($H_{11}$) segment is, in one embodiment, functionalized with a suitable reversible addition fragmentation (RAFT) chain transfer agent (CTA) to permit the formation of a composition in accordance with Formula (VIII) above. Given this, one of skill in the art would recognize the suitable combinations of the above polymer compounds that could be used to form crosslinkable and/or polymerizable block copolymers in accordance with Formula (VIII).

In another embodiment, compounds in accordance with Formula (VIII) can be formed from other suitable combinations of the hydrophilic and hydrophobic compounds discussed above. Accordingly, the compounds in accordance with Formula (VIII) are not limited to just the above-mentioned combination.

Initiators:

In one embodiment, the present invention utilizes at least one suitable initiator compound in order to initiate crosslinking and/or polymerization of the one or more crosslinkable and/or polymerizable block copolymers in accordance with the present invention. Suitable initiator compounds include, but are not limited to, azo-based initiator compounds (e.g., azobisisobutyronitrile (AIBN —(CH$_3$)$_2$C(CN)N=NC (CH$_3$)$_2$CN)), and peroxy-based initiator compounds. In another embodiment, crosslinking and/or polymerization of the one or more crosslinkable and/or polymerizable block copolymers of the present invention is accomplished using light (e.g., ultraviolet light), heat, an initiator compound, or some combination of two or more of the above.

In one embodiment, the initiator used to form amphiphilic co-networks in accordance with the present invention is azobisisobutyronitrile (AIBN), the structure of which is shown below:

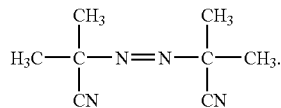

Crosslinkers:

In one embodiment, the present invention utilizes a crosslinker to form APCNs from the above crosslinkable polymer compositions. Suitable crosslinkers include, but are not limited to, one or more mono-, di-, tri- or tetra-modified cyclopentasiloxane crosslinking composition as shown in the formula below:

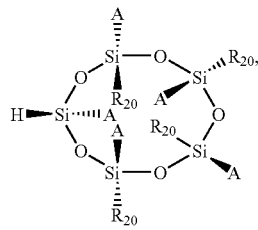

where the As are either all methyl groups, all ethyl groups, or all propyl groups, where each R$_{20}$ is independently selected from hydrogen, a moiety having one or more ethylene oxide units and 2 to 20 carbon atoms, a di-glycol moiety that contains from 4 to about 20 carbon atoms, an ether moiety that contains from about 4 to about 20 carbon atoms, a partially or fully halogenated ether moiety that contains from about 4 to about 20 carbon atoms, or a siloxy silane moiety according to the formula shown below:

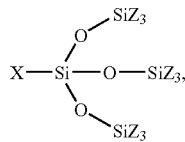

where X is a linear or branched C$_1$ to C$_{10}$ alkyl group, a linear or branched C$_2$ to C$_{10}$ alkenyl group, a linear or branched C$_2$ to C$_{10}$ alkynyl group, and where each Z is independently selected from a linear or branched C$_1$ to C$_{20}$ alkyl group, a linear or branched C$_2$ to C$_{20}$ alkenyl group, a linear or branched C$_2$ to C$_{10}$ alkynyl group, with the proviso that the crosslinking composition contains at least two H—Si bonds.

In another embodiment, the crosslinker of the present invention is or is derived from one or more alkyl-substituted cyclopentasiloxane compositions (e.g., pentamethylcyclopentasiloxane—D$_5$H). Pentamethylcyclopentasiloxane (D$_5$H) is available commercially and its structure is shown below:

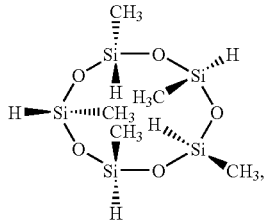

Other crosslinking compositions in addition to the crosslinking compound shown above can be utilized in conjunction with the present invention, and the present invention is not limited to just the above crosslinking composition. Other exemplary crosslinking agents suitable for use with the crosslinkable polymers of the present invention can be found in PCT Patent Application No. PCT/US2007/017312, filed Aug. 3, 2007, entitled "Amphiphilic Grafts and Co-Networks and Process for Making Same," the disclosure of which is incorporated herein by reference in its entirety.

In still another embodiment, the crosslinking composition of the present invention is polyhydromethylsiloxane (PHMS).

Examples with Crosslinkable and/or Polymerizable Group Y:
  Crosslinking and Formation of Amphiphilic Co-Networks:

Turning to FIG. 1, FIG. 1 illustrates one suitable reaction scheme for forming and/or producing amphiphilic co-networks (APCNs) in accordance with the present invention. In one embodiment, the APCNs produced by the Reaction Scheme of FIG. 1 are used to produce contact lenses.

The reaction scheme/process of FIG. 1 starts with the synthesis of a macromolecular reversible addition fragmentation (RAFT) chain transfer agent (CTA) according to Formula 2 of FIG. 1 by the end functionalization of Formula 1 of FIG. 1 with commercially available S-1-dodecyl-S'(α,α'-dimethyl-α"-acetyl chloride) trithiocarbonate. Regarding RAFT polymerization, such polymerization process are known in the art. As such, a detailed description herein is omitted for the sake of brevity.

In the second step of the reaction scheme/process of FIG. 1, Formula 2 is utilized to initiate a RAFT polymerization process involving DMAAm and Formula 2 in a suitable solvent system (e.g., toluene and t-butanol). It should be noted that the present invention is not limited to just the above solvent system. Rather, any suitable solvent system known to those of skill in the art can be used. The polymerization process between DMAAm and Formula 2 yields a compound according to Formula 3 which is an amphiphilic triblock of a hydrophobic PDMS inner segment flanked by two hydrophilic PDMAAm segments fitted with terminal RAFT-CTA moieties. The RAFT-CTA of the present invention is able to polymerize DMAAm in a controlled fashion with high yields. In one embodiment, both the PDMS and PDMAAm segments are biocompatible and biostable, and have excellent adaptability for medical applications.

In the next step, the trithiocarbonate chain termini in Formula 3 induce controlled RAFT polymerization of the 2-hydroxylethyl acrylate (HEA) units to yield the pentablock compound of Formula 4 that still contains the RAFT-CTA moiety at the chain ends. Following this, the removal of the RAFT-CTA in Formula 4 is accomplished by treatment with azobisisobutyronitrile (AIBN) thereby yielding a compound according to Formula 5. Due to the presence of the trithiocarbonate groups, the compound of Formulas 3 and 4 are markedly yellow; this color, in one embodiment, should be eliminated for optical applications.

In Step 5 the terminal pendant —OH groups in Formula 5 are converted by esterification with methacryloyl chloride to crosslinkable methacrylate (MA) groups. Finally, per the Reaction Scheme of FIG. 1, the amphiphilic pentablock according to Formula 6 is crosslinked by the use of azobisisobutyronitrile (AIBN) to yield a amphiphilic co-network.

EXPERIMENTAL

Materials:

Anhydrous dichloromethane and methacryloyl chloride (supplier Aldrich), oxalyl chloride (as 2M solution in dichloromethane, supplier Acros) and HO—$CH_2$—$CH_2$—O—$CH_2$—$CH_2$—$CH_2$—O—[Si($CH_3$)$_2$—O]$_1$—$CH_2$—$CH_2$—$CH_2$—O—$CH_2$—$CH_2$—OH (Formula 1 in FIG. 1, supplier Gelest) are used as received. S-1-Dodecyl-S'($\alpha,\alpha'$-dimethyl-$\alpha''$-acetic acid) trithiocarbonate (RAFT-CTA) is synthesized using a procedure described by J. T. Lai et al.; *Macromolecules*, 2002, 35, p. 6754. DMAAm and 2-hydroxyl ethylacrylate (HEA) (supplier Aldrich) are purified by passing the liquids through a column of basic alumina. Azobisisobutyronitrile (AIBN) (supplier Aldrich) is purified by recrystallization from methanol.

Syntheses:

(A) Synthesis of the Polymeric Chain Transfer Agent (Formula 2):

RAFT-CTA (4.36 grams, 0.012 moles) is dissolved in 20 mL of anhydrous $CH_2Cl_2$ in a 100 mL round bottom flask and oxalyl chloride in $CH_2Cl_2$ (9 mL, 0.018 moles) is added via a syringe into the solution. The system is stirred for 4 hours at room temperature (i.e., approximately 25° C.). The volatiles are removed by vacuum, and the yellow residue is dissolved in 10 mL of $CH_2Cl_2$. This solution is syringed into a solution of 20 grams of Formula 1 (containing 0.008 moles of hydroxyl groups) in 50 mL of anhydrous $CH_2Cl_2$ in a 500 mL flask, and the system is stirred for 24 hours at room temperature. The volatiles are removed by vacuum and the yellow viscous oil obtained is washed several times with methanol to remove the unreacted RAFT-CTA. The polymeric chain transfer agent Formula 2, a yellow oil, is dried in vacuum at room temperature for 24 hours. The yield is 21 grams (92 percent). $^1$H NMR: 0 (s, 6H, ($CH_3$)$_2$Si), 0.6 (m, Si—$CH_2$), 0.8 (t, 3H, —($CH_2$)$_8$—$CH_3$), 1.4 (—$CH_2$—($CH_2$)$_8$—$CH_3$)-1.6 (m, Si—$CH_2$—$CH_2$—), 1.8 (s, 6H, —C($CH_3$)$_2$—S—), 3.2 (t, 2H, —S—$CH_2$—($CH_2$)$_8$—), 3.5 (t, $CH_2$—O—$CH_2$—), 3.6 ($CH_2$—O—$CH_2$—), 4.2 (t, $CH_2$—$CH_2$—O—C(=O)).

(B) Synthesis of PDMAAm-b-PDMS-b-PDMAAm Triblock Copolymer (Formula 3):

The polymeric chain transfer agent (Formula 2), (2.5 grams, 1×10$^{-3}$ moles) is placed in a Schlenk tube, and toluene (5 mL), t-butyl alcohol (5 mL), AIBN (0.015 grams, 0.09×10$^{-3}$ moles) and DMAAm (2.5 grams, 25.2×10$^{-3}$ moles) are added. The system is closed and degassed by three freeze-thaw cycles, and placed in an oil bath at 70° C. for 24 hours. After cooling to room temperature, the contents of the flask are transferred into a beaker, and the volatiles are removed by vacuum at room temperature thereby yielding a yellow powder. The yield is 4.8 grams (96 percent). $^1$H NMR: 0 (s, 6H, ($CH_3$)$_2$Si), 0.6 (m, Si—$CH_2$), 0.8 (t, 3H, —($CH_2$)$_8$—$CH_3$), 1-2 (—$CH_2$—CH—C(=O), —1.4 (—$CH_2$—($CH_2$)$_8$$CH_3$)-1.6 (m, Si—$CH_2$—$CH_2$), 1.8 (s, 6H, —C($CH_3$)$_2$—S—), 2-3.2 N—($CH_3$)$_2$, 3.2 (t, 2H, —S—$CH_2$—($CH_2$)$_8$—), 3.5 (t, $CH_2$—O—$CH_2$—), 3.6 ($CH_2$—O—$CH_2$—), 4.2 (t, $CH_2$—$CH_2$—O—C(=O)).

(C) Synthesis of PHEA-b-PDMAAm-b-PDMS-b-PDMAAm-b-PHEA Pentablock Copolymer (Formula 4):

Block copolymer (Formula 3) (5 grams, 1.05×10$^{-3}$ moles) is placed in a 100 mL Schlenk tube and t-butyl alcohol (20 mL), AIBN (0.0118 grams, 7.2×10$^{-5}$ moles) and HEA (0.58 grams, 5.8×10$^{-3}$ moles) are added thereto. The system is closed, degassed by three freeze-thaw cycles, and is placed in an oil bath at 70° C. for 12 hours. After cooling to room temperature, the contents of the tube are transferred to a beaker, and the volatiles are removed by vacuum at room temperature. The yield is 5.5 grams (98 percent) of a yellow powder. $^1$H NMR: 0 (s, 6H, ($CH_3$)$_2$Si), 0.6 (m, Si—$CH_2$), 0.8 (t, 3H, —($CH_2$)$_8$—$CH_3$), 1-2 ($CH_2$—CH—C(=O), 1.4 (—$CH_2$—($CH_2$)$_8$—$CH_3$)-1.6 (m, Si—$CH_2$$CH_2$—), 1.8 (s, 6H, —C($CH_3$)$_2$—S—), 2-3.2 N—($CH_3$)$_2$, 3.2 (t, 2H, —S—$CH_2$—($CH_2$)$_8$—), 3.5 (t, $CH_2$—O—$CH_2$—), 3.6 ($CH_2$—O—$CH_2$—), 4.2 (t, $CH_2$—$CH_2$—O—C(=O)), 3.8 (—$CH_2$—OH) and 4.2 (b, —$CH_2$—O—C(=O)—).

(D) Removal of the RAFT-CTA Residue from the Block Copolymer (Formulas 4 to 5):

Formula 4 (5 grams, 1×10$^{-3}$ moles) is placed in a Schlenk tube and THF (30 mL) and AIBN (3.4 grams, 20×10$^{-3}$ mole) are added. The system is closed, degassed by three freeze-thaw cycles, and is placed in an oil bath at 70° C. for 12 hours. After cooling to room temperature, the contents of the tube are transferred to a 100 mL beaker and the volatiles are removed by vacuum at room temperature. The product is extracted with boiling hexanes. The yield is 4.3 grams (86 percent) of a colorless powder.

(E) Synthesis of Methacrylate Telechelic Block Copolymer (Formula 6):

Formula 5 (5 grams, 1×10$^{-3}$ moles) is dissolved in 25 mL of anhydrous dichloromethane and the solution is cooled to 0° C. by placing it in an ice bath. Methacryloyl chloride (0.74 mL, 5.4×10$^{-3}$ moles) and triethylamine (0.7 mL, 5.4×10$^{-3}$ moles) are added and the solution is stirred overnight at room temperature. The solution is then filtered, the dichloromethane is removed by rotovap, and the unreacted methacryloyl chloride is removed by extraction with hexanes. The product is dried in a vacuum at room temperature for 24 hours. The yield is 4.8 grams (84 percent) of a colorless powder. $^1$H NMR: 0 (s, 6H, ($CH_3$)$_2$Si), 0.6 (m, Si—$CH_2$), 0.8 (t, 3H, —($CH_2$)$_8$—$CH_3$), 1-2 ($CH_2$—CH—C(=O), 1.4 (—$CH_2$—($CH_2$)$_8$—$CH_3$)-1.6 (m, Si—$CH_2$—$CH_2$—), 1.8 (s, 6H, —C($CH_3$)$_2$—S—), 2-3.2 N—($CH_3$)$_2$, 3.2 (t, 2H, —S—$CH_2$—($CH_2$)$_8$—), 3.5 (t, $CH_2$—O—$CH_2$—), 3.6 ($CH_2$—O—$CH_2$—), 4.2 (t, $CH_2$—$CH_2$—O—C(=O)), 3.8 (—$CH_2$—OH), 4.2 (b, —$CH_2$—O—C(=O)—), 5.6 and 6.2 (s, $CH_2$=C—).

(F) Network Synthesis:

The synthesis of a representative amphiphilic co-network (APCN) is carried out as follows: Formula 6 (0.4 grams, 10 K, 8.5×10$^{-5}$ moles), AIBN (0.0036 grams, 2.19×10$^{-5}$ moles) and tetrahydrofuran (0.7 mL) are placed in a glass vial and shaken to form a homogeneous solution. The solution is degassed by bubbling nitrogen through it for 5 minutes, placed in a glove box, and transferred into the cavity of the mold formed by a Teflon ring (2.7 cm diameter, 1.5 cm height) glued to a glass plate. The charge in the mold is placed between two steel plates, and secured air tight by four posts and screws. The system is removed from the glove box and placed in an oven at 80° C. for 16 hours. After crosslinking is complete, a film is removed from the mold cavity by submerging the device in water. The film is extracted by placing it in isopropanol and shaking for 8 hours.

Figure 2:
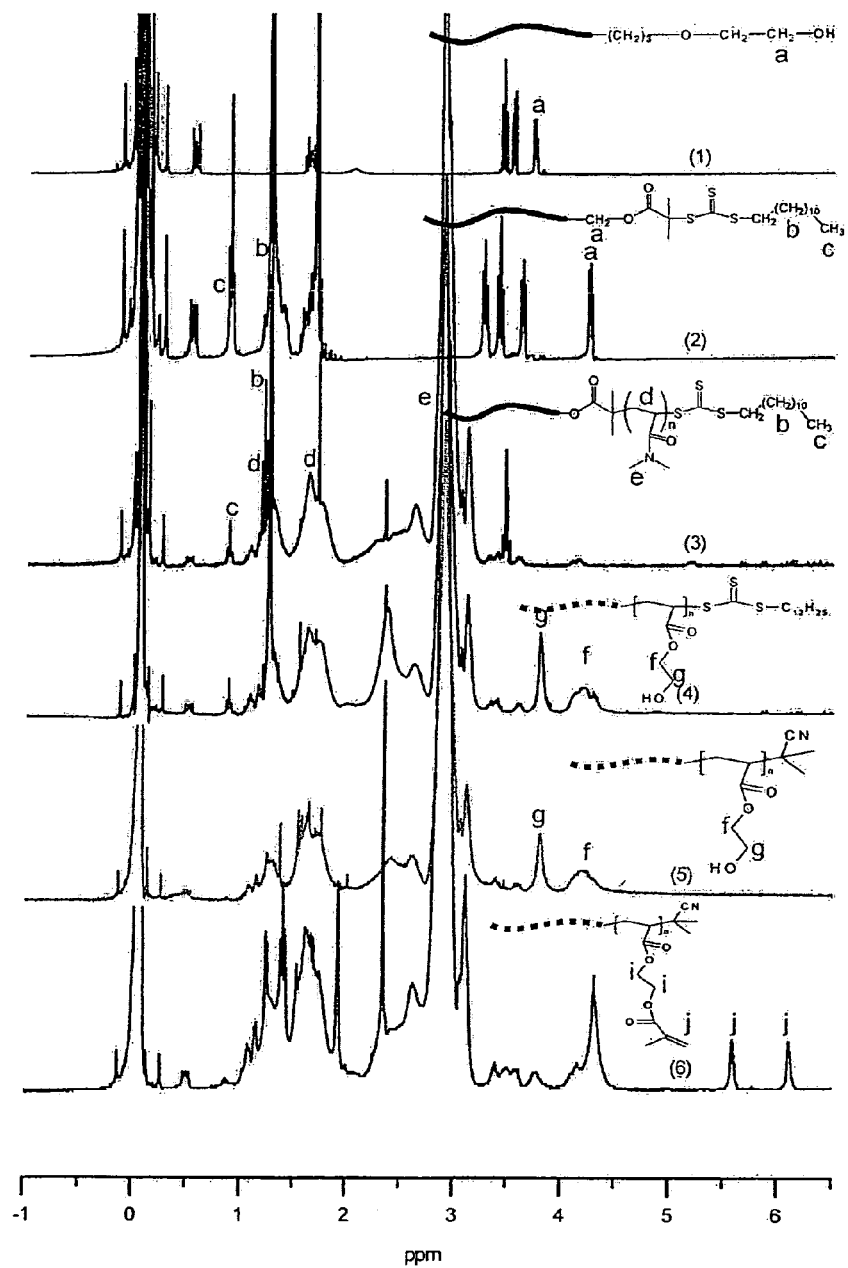
FIG. 2 is a $^1$H NMR spectra of Formulas 1 through 6, together with key segments, of the synthesis scheme of FIG. 1.
Figure 3:
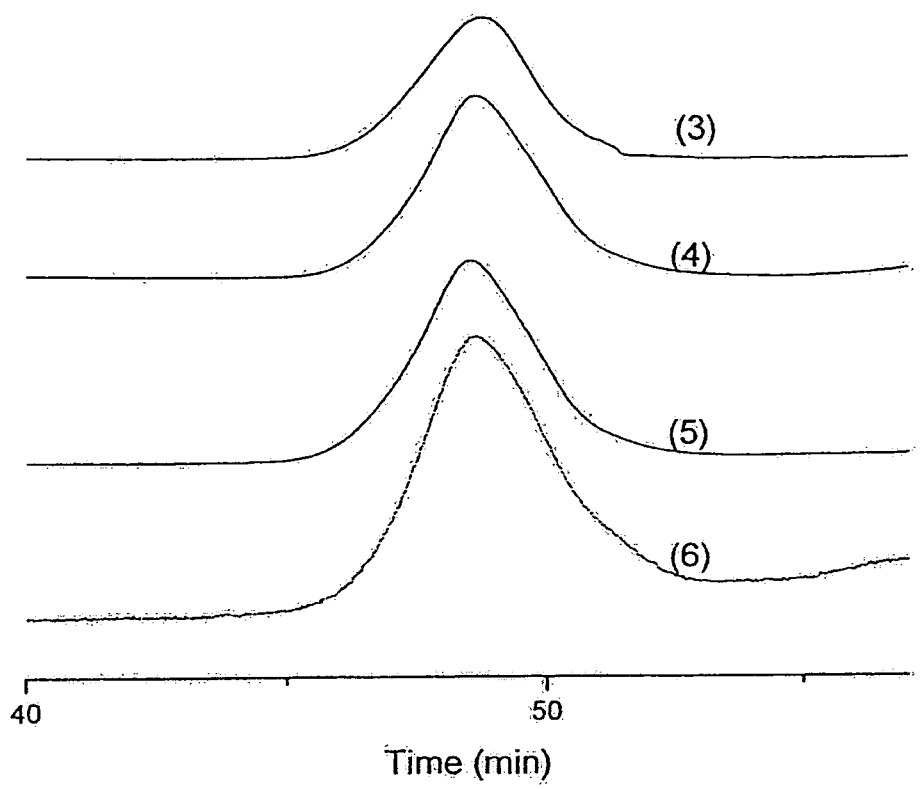
FIG. 3 is a graph illustrating GPC traces of Formulas 3 through 6 of the synthesis scheme of FIG. 1.
Figure 4:
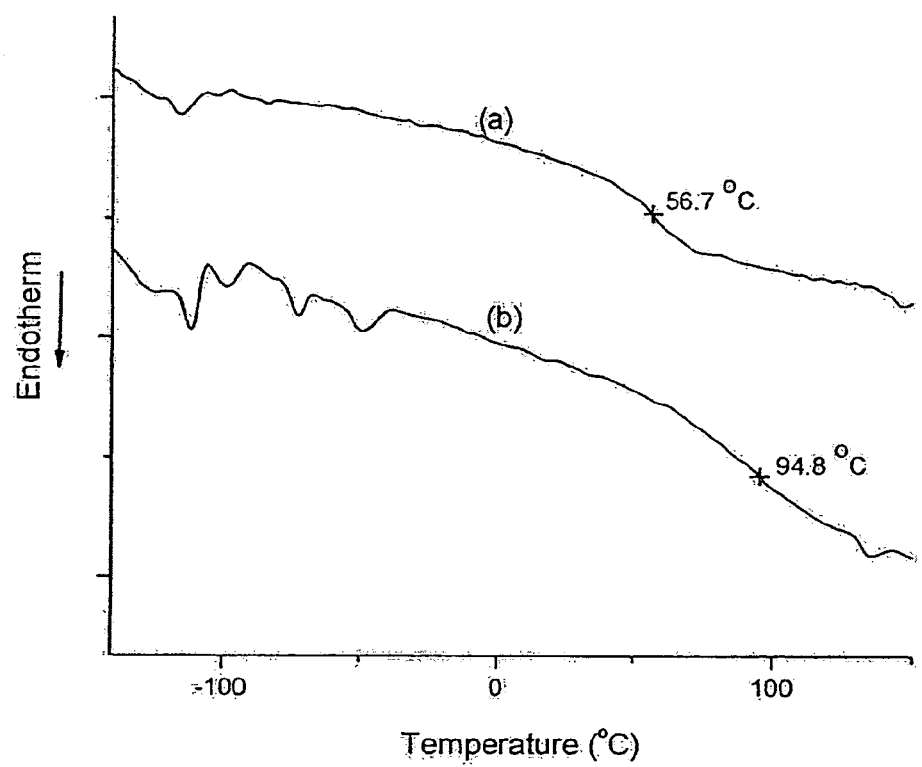
FIG. 4 is a graph illustrating DSC traces of: (a) MA-telechelic block copolymer (Formula 6); and (b) an amphiphilic co-network (APCN) synthesized by crosslinking Formula 6.

Characterization:

$^1$H spectra are acquired using a Varian Unity plus 300 MHz spectrometer by the use of CDCl$_3$ solvent (see FIG. 2). The GPC traces of FIG. 3 are obtained with a Waters GPC instrument equipped with a series of six Styragel columns (HR 0.5, HR 1, HR 3, HR 4, HR 5, and HR 6; Waters) calibrated with narrow molecular weight distribution polystyrene standards, and a refractive index (RI) detector (Optilab, Wyatt Technology). The flow rate is 1 mL of THF/min. The differential scanning calorimetry (DSC) of FIG. 4 is performed with a DuPont 2100 thermal analyzer under a nitrogen atmosphere at a heating rate of 10° C./min. Swelling in water (equilibrium water content, EWC) is determined by placing pre-weighed samples of amphiphilic membranes (approximately 4 by 1 cm) in distilled water, and the extent of swelling is determined by periodically removing the membranes from the water, removing the water absorbed to the surfaces of such membranes through blotting with optical tissue paper, and weighing. The equilibrium water swelling of the amphiphilic membranes of the present invention are recorded when the weight of the water-swollen membranes remain unchanged, at room temperature, for a 24 hour period.

Results and Discussion:

The synthesis of Formula 2 by esterification of Formula 1 ($M_n$=5000 grams/mole, as determined by $^1$H NMR spectroscopy) with the acid chloride of RAFT-CTA proceeds smoothly to high conversion (approximately 92 percent or more). The RAFT-CTA is converted into the acid chloride by reaction with oxalyl chloride. FIG. 2 shows the NMR spectra of the starting material Formula 1 and the polymeric RAFT-CTA (Formula 2). The $^1$H NMR spectrum of Formula 2 shows a resonance at 4.2 ppm due to the —CH$_2$—O—C=O group, and the absence of resonance at 3.7 ppm associated with —CH$_2$—OH indicates essentially complete conversion of —OH end groups in Formula 1. The use of PDMS with carbinol end groups (—CH$_2$—OH) leads to hydrolytically stable end products. The use of silanol (Si—OH) termini would have led to hydrolytically unstable of Si—O—C— bonds.

The next target is a triblock copolymer containing equal amounts (weight percent) of PDMS and PDMAAm. Conditions are developed under which the polymerization of DMAAm initiated by Formula 2 proceeds smoothly to the desirable molecular weight ($M_n$=2500 g/mol) PDMAAm segment. The $M_n$ of the PDMAAm segment is determined by $^1$H NMR spectroscopy by comparing the area of resonance at 2.8 ppm (due to —N(CH$_3$)$_2$ of PDMAAm) and 0.8 ppm due to —CH$_3$ of RAFT-CTA. FIG. 2 shows the spectrum of Formula 3. FIG. 3 shows the GPC trace of Formula 3, which indicates a narrow molecular weight distribution product typical of controlled radical polymerizations.

Next one introduces —OH groups at the termini. This step, reaction Formula 3 to Formula 4 is accomplished by the use of HEA in the presence of AIBN in t-butanol. The concentration of HEA is adjusted so as to produce approximately 5 HEA units at either end of Formula 4. The incorporation of HEA groups is confirmed by $^1$H NMR spectroscopy (resonances at 3.8 and 4.2 ppm due to —CH$_2$—OH and —CH$_2$—O—C(=O)— groups respectively). The molecular weight distribution remained narrow as indicated in by the results contained in FIG. 3.

In the case of optical applications, an amphiphilic co-network needs to be colorless, that is the yellow colored RAFT-CIA moiety at the chain ends has to be removed in this instance. Based on reference and considerable additional experimentation, conditions are developed to accomplish this step (transformation of Formula 4 to Formula 5) by reacting the pentablock (Formula 4) with a large excess of AIBN in THF at 80° C. The byproducts of the reaction are removed by extraction with hot (60° C.) hexanes. The polymer of Formula 5 is colorless suggesting the complete absence of the RAFT-CIA moiety. This conclusion is confirmed by $^1$H NMR spectroscopy. The scan of Formula 5 shown in FIG. 1 indicates the absence of resonances at 0.8 and 1.2 ppm due to —CH$_3$ and —CH$_3$—(CH$_2$)$_8$— groups of the RAFT-CTA. According to GPC evidence (see trace 5 in FIG. 2), the molecular weight and weight distribution does not change during this transformation.

Efforts are made to reduce the number of HEA units in Formula 4, and to prepare triblocks fitted with a single HEA unit at both ends. Unexpectedly, pentablocks with less than 4 terminal HEA units (i.e., 3 terminal HEA units, prepared in separate experiments) are found to be soluble in hot hexanes; thus one is unable to remove the byproducts by the simple solubility based extraction. Additionally, a triblock which contains more than 50 weight percent of PDMAAm should be insoluble in hot hexanes and would lead to triblocks fitted with one HEA unit.

The esterification of Formula 5 with methacryloyl chloride is carried out with triethyl amine as the scavenger in methylene chloride. The unreacted methacryloyl chloride is removed with hexanes and the MA-telechelic amphiphilic block copolymer Formula 6 is obtained as a colorless powder. The $^1$H NMR spectrum of Formula 6 presented in FIG. 1 shows resonances at 5.6 and 6.2 ppm indicating the presence of expected CH$_2$=C— groups. The absence of a resonance at 3.8 ppm due to —CH$_2$—OH of the HEA group indicated that all the HEA units are converted to methacrylates. As indicated by the GPC traces in FIG. 2, all the products exhibit reasonably narrow molecular weight distribution suggesting efficient synthetic steps.

The crosslinking of Formula 6 is effected by the use of AIBN at 80° C. The APCN obtained is characterized by swelling experiments in both water and hexanes.

After exhaustive extraction with isopropanol (sol fraction 15 percent), the equilibrium water uptake is found to be approximately 30 percent. The overall composition (weight percent) of the extracted APCN is PDMAAm (45 percent), PDMS (45 percent), and crosslinking clusters (10 percent). Membranes obtained by crosslinking are transparent, optically clear and colorless, and they maintained these properties for several weeks both in the dry and water-swollen states. Examples with Crosslinkable and/or Polymerizable Hydrophilic or Hydrophobic Group:

Crosslinking and Formation of Amphiphilic Co-Networks:

Turning to FIG. 5, FIG. 5 illustrates one suitable reaction scheme for forming and/or producing amphiphilic co-networks (APCNs) in accordance with the present invention. In one embodiment, the APCNs produced by the Reaction Scheme of FIG. 5 are used to produce contact lenses.

The reaction scheme/process of FIG. 5 starts with the synthesis of a macromolecular reversible addition fragmentation (RAFT) chain transfer agent (CTA) according to Formula 1 of FIG. 5 by the end functionalization of Formula (V) with commercially available S-1-dodecyl-S'(α,α'-dimethyl-α"-acetic chloride) trithiocarbonate. Regarding RAFT polymerization, such polymerization processes are known in the art. As such, a detailed description herein is omitted for the sake of brevity.

In the first step of the reaction scheme/process of FIG. 5, Formula 1 is utilized to initiate a RAFT polymerization process involving DMAAm and Formula 1 in a suitable solvent system (e.g., toluene and t-butanol). It should be noted that the present invention is not limited to just the above solvent system. Rather, any suitable solvent system known to those of skill in the art can be used. The polymerization process between DMAAm and Formula 1 yields a compound according to Formula 2 which is an amphiphilic triblock of a hydrophobic PDMS inner segment flanked by two hydrophilic PDMAAm segments fitted with terminal RAFT-CTA moieties. The RAFT-CTA of the present invention is able to polymerize DMAAm in a controlled fashion with high yields. In one embodiment, both the PDMS and PDMAAm segments are biocompatible and biostable, and have excellent adaptability for medical applications.

In the next step, the trithiocarbonate chain termini in Formula 3 induce controlled RAFT polymerization of a suitable allyl acrylate compound (e.g., allyl methacrylate) to yield the pentablock compound of Formula 3 that still contains the RAFT-CTA moiety at the chain ends and now contains the aforementioned PAMA-b-PDMAAm-b-PDMS-b-PDMAAm-b-PAMA pentablock. Following this, the removal of the RAFT-CTA in Formula 3 is accomplished by treatment with hexyl amine and tetrahydrofuran (THF) at room temperature (RT) thereby yielding a compound according to Formula 4. Due to the presence of the trithiocarbonate groups, the compound of Formula 3 is markedly yellow; this color, in one embodiment, should be eliminated for optical applications.

In the next step, the compound of Formula 4 is crosslinked to form an APCN via a reaction with Karstedt's catalyst, a suitable crosslinker (e.g., $D_5H$), and THF to yield an amphiphilic co-network.

EXPERIMENTAL

Materials:

Anhydrous dichloromethane and hexyl amine (Aldrich), oxalyl chloride (2 M solution in dichloromethane, Acros) are used as received. $HO-CH_2-CH_2-O-CH_2-CH_2-CH_2-O-[Si(CH_3)_2-O]_n-CH_2-CH_2-CH_2-O-CH_2-CH_2-OH$, $D_5H$, and Karstedt's catalyst are available from Gelest and are used without purification. The RAFT chain transfer agent (CTA) S-1-dodecyl-S'($\alpha,\alpha'$-dimethyl-$\alpha''$-acetic acid) trithiocarbonate is synthesized using a procedure described by J. T. Lai et al.; *Macromolecules*, 2002, 35, p. 6754. DMAAm and allyl methacrylate (AMA) (Aldrich) are purified by passing the liquids through a column of basic alumina. Azobisisobutyronitrile (AIBN) (Aldrich) is purified by recrystallization from methanol.

Syntheses:

(A) Synthesis of the Polymeric Chain Transfer Agent (Formula 1):

RAFT-CTA (4.36 grams, 0.012 moles) is dissolved in 20 mL of anhydrous $CH_2Cl_2$ in a 100 mL round bottom flask and oxalyl chloride in $CH_2Cl_2$ (9 mL, 0.018 moles) is added via a syringe into the solution. The system is stirred for 4 hours at room temperature (i.e., approximately 25° C.). The volatiles are removed by vacuum, and the yellow residue is dissolved in 10 mL of $CH_2Cl_2$. This solution is syringed into a solution of 20 grams of Formula (V) (containing 0.008 moles of hydroxyl groups) in 50 mL of anhydrous $CH_2Cl_2$ in a 500 mL flask, and the system is stirred for 24 hours at room temperature. The volatiles are removed by vacuum and the yellow viscous oil obtained is washed several times with methanol to remove the unreacted RAFT-CTA. The polymeric chain transfer agent Formula 1, a yellow oil, is dried in vacuum at room temperature for 24 hours. The yield is 21 grams (92 percent). $^1$H NMR: 0 (s, 6H, $(CH_3)_2$—Si), 0.6 (m, Si—$CH_2$), 0.8 (t, 3H, —$(CH_2)_8$—$CH_3$), 1.4 (—$CH_2$—(C$H_2)_8$—$CH_3$)-1.6 (m, Si—$CH_2$—$CH_2$), 1.8 (s, 6H, —C(C$H_3)_2$—S—), 3.2 (t, 2H, —S—$CH_2$—$(CH_2)_8$—), 3.5 (t, C$H_2$—O—$CH_2$—), 3.6 ($CH_2$—O—$CH_2$—), 4.2 (t, $CH_2$—C$H_2$—O—C(=O)).

(B) Synthesis of Pentablock Compound (PAMA-b-PDMAAm-b-PDMS-b-PDMAAm-b-PAMA—Formula 3):

Block copolymer 2 (5 grams, $1.05\times10^{-3}$ moles) is placed in a 100 mL Schlenk tube, and t-butyl alcohol (20 mL), toluene (20 mL), AIBN (0.0118 grams, $7.2\times10^{-5}$ moles) and AMA (0.73 grams, $5.8\times10^{-3}$ moles) are added. The tube is closed, degassed by three freeze/thaw cycles, and placed in an oil bath at 70° C. for 12 hours. After cooling to room temperature, the contents of the tube are transferred to a 100 mL beaker, and the volatiles are removed by vacuum at room temperature. The yield is 5.5 grams (98 percent) of a yellow powder. $^1$H NMR (CDCl$_3$, 300 MHz): δ 0.1 (s, 6H, (C$H_3)_2$—Si), 0.6 (m, Si—$CH_2$), 0.8 (t, 3H, —$(CH_2)_8$—$CH_3$), 1-2 ($CH_2$—CH—C(=O)—N—), 1.4 (—$CH_2$—(C$H_2)_8$—$CH_3$), 1.6 (m, Si—$CH_2$—$CH_2$—), 2.8 (b, N—(C$H_3)_2$), 3.2 (t, 2H, —S—$CH_2$—$(CH_2)_8$—), 3.5 (t, C$H_2$—O—$CH_2$—), 3.6 ($CH_2$—O—$CH_2$—), 4.2 (t, $CH_2$—C$H_2$—O—C(=O)), 4.4 (d, —$CH_2$—CH=$CH_2$), 5.1 and 5.3 (m, —$CH_2$—CH=$CH_2$), 6 (m, —$CH_2$—CH=$CH_2$).

(C) Removal of the RAFT-CTA Residue from the Block Copolymer (Formula 3 to Formula 4):

A suitable amount of Formula 3 (5 grams, $1\times10^{-3}$ moles) is placed in a 100 mL Schlenk tube, dissolved in anhydrous THF (30 mL), and the solution is deareated by bubbling $N_2$ for 20 minutes. Hexyl amine (0.1 grams, $1\times10^{-3}$ moles) is added and the mixture is stirred at room temperature for 16 hours. The THF is removed via a rotavap, and the white residue is extracted with hexanes to remove the RAFT-CTA. The yield is 4.3 grams (86 percent) of a colorless powder. $^1$H NMR (CDCl$_3$, 300 MHz): δ 0.1 (s, 6H, $(CH_3)_2$—Si), 0.6 (m, Si—C$H_2$), 1-2 ($CH_2$—CH—C(=O)—N—), 1.6 (m, Si—$CH_2$—C$H_2$—), 2.8 (b, N—(C$H_3)_2$), 3.5 (t, $CH_2$—O—$CH_2$—), 3.6 ($CH_2$—O—$CH_2$—), 4.2 (t, $CH_2$—C$H_2$—O—C(=O)), 4.4 (d, —$CH_2$—CH=$CH_2$) 5.1 and 5.3 (m, —$CH_2$—CH=C$H_2$), 6 (m, —$CH_2$—CH=$CH_2$).

(D) Network Synthesis:

The synthesis of a representative network is carried out as follows: a suitable amount of Formula 4 (0.4 grams, Mn=10,000 g/mol, $8.5\times10^{-5}$ moles), $D_5H$ (0.255 grams, $8.5\times10^{-4}$ moles) and THF (1 mL) are placed in a 4 mL vial and shaken well to form a homogeneous solution. Karstedt's catalyst solution (50 μL) is added, and the charge is poured into the rectangular (8×8 cm) cavities of a Teflon mold. Crosslinking is effected by placing the system in a heating oven at 70° C. for 4 hours. After crosslinking is deemed complete, the film is removed from the mold cavity by submerging the device in water. The film is extracted by placing in isopropanol and gently shaking for 8 hours.

Characterization:

$^1$H spectra are acquired by a Varian Unity plus 300 MHz spectrometer with the use of CDCl$_3$ as the solvent. GPC traces are obtained with a Waters GPC instrument equipped with a series of six Styragel columns (HR 0.5, HR 1, HR 3, HR 4, HR 5, and HR6; Waters) calibrated with narrow molecular weight distribution polystyrene standards, and a refractive index (RI) detector (Optilab, Wyatt Technology). The flow rate is 1 mL of THF/min. Swelling in water (equilibrium water content, EWC) is determined by the method described in Karunakaran, R.; Kennedy, J. P.; *J. Polym. Sci. Part A: Polym. Chem.*, 2007, 45, p. 4284.

Results and Discussion:

Scheme 1 summarizes the synthetic one process by which the present invention yields APCNs. The procedure consists of two steps:

(1) The Synthesis of the Allyl Telechelic Pentablock (Formula 4):

The intermediate of Formula 4 is obtained in 5 steps. Initially, the synthesis of the macrochain transfer agent Formula 1 of 5000 g/mol molecular weight and its use for the polymerization of DMAAm to afford Formula 2 having 1:1 weight percent of PDMS and PDMAAm. Next, one uses Formula 2 to effect the RAFT polymerization of 5 mole percent AMA, and thus obtains Formula 3 carrying approximately 5 terminal allyl methacrylate (AMA) units. Finally the RAFT-CTA is removed by reductive elimination (aminolysis) with hexyl amine to obtain the thiol ended block copolymer Formula 4. The absence of yellow color of the final product indicates the successful removal of the RAFT-CTA. This reductive elimination method is in one instance superior to free radical induced elimination as the possibility of reaction of allyl groups with free radicals is avoided.

Figure 6:
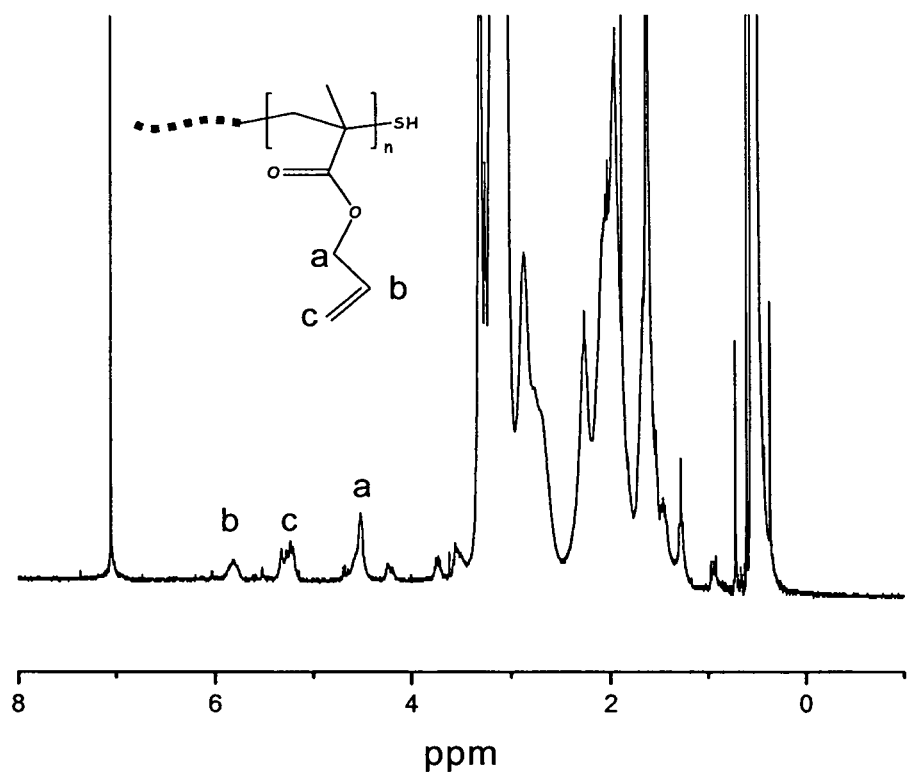
FIG. 6 is a $^1$H NMR spectra of Formula 4 of the synthesis scheme of FIG. 5.

The intermediates are characterized by $^1$H NMR spectroscopy. The triblock copolymer according to Formula 2 shows the signature resonances of $Si(CH_3)_2$ of PDMS and $N(CH_3)_2$ of PDMAAm, as well as those associated with the RAFT-CTA. The introduction of terminal allyl methacrylate groups result in additional resonances at 4.3 ppm due to $CH_2$—$CH$=$CH_2$ and in the 5 to 6 ppm range due to $CH_2$=$CH$—$CH_2$. The compound according to Formula 4 does not show any resonances associated with the RAFT-CTA indicating its complete removal. FIG. 6 shows the $^1$H NMR spectrum for Formula 4.

The molecular weight distribution of samples of Formulas 2 and 3 are 1.2 to 1.3, typical of controlled radical polymerization. Additionally, the molecular weight and molecular weight distribution of the block copolymer remain unchanged after the reductive elimination.

(2) Crosslinking by Hydrosilation with $D_5H$:

Orienting experiments are carried out by reacting Formula 4 with a large (approximately 10 fold) stoichiometric excess of $D_5H$, and the $^1$H NMR spectrum of the $D_5H$ telechelic product is analyzed. The absence of resonances associated with the allyl termini indicates complete hydrosilation, while new resonances appear at 0.5, 1.7 and 3.7 ppm associated with the presence of Si—$CH_2$, Si—$CH_2CH_2$, and Si—$CH_2$—$CH_2$—$CH_2$—O— groups, respectively.

Thereafter, an APCN is obtained by the use of 1.2 stoichiometric excess of $D_5H$ with respect to Formula 4. To remove the sol fraction the network is extracted with isopropanol for 24 hours at room temperature. The low amount of sol (less than about 5 weight percent) indicates high crosslinking efficiency.

The networks are optically clear in both their dry and water swollen states. However, they can have a dark brown tinge due to the presence of catalyst residue. They swell readily in both water and hexanes indicating the presence of co-continuous hydrophilic and hydrophobic domains. The equilibrium water content of a co-network containing 45 weight percent of PDMAAm is 35 percent.

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

What is claimed is:

1. A crosslinkable and/or polymerizable block copolymer composition comprising at least one composition according to the following Formula:

$$R—(Y)_a-(Hi)_x-(Ho)_y-(Hi)_z-(Y)_b—R \qquad (I)$$

where (Hi) represents a hydrophilic polymer segment and (Ho) represents a hydrophobic polymer segment;

where x, y and z represent the number of repeating units in each hydrophilic (Hi) and/or hydrophobic (Ho) polymer segment, with each of x, y and z being independently selected from an integer in the range of about 2 to about 5,000;

where each Y is independently selected from acrylate, methacrylate, an alkyl acrylate group having between 3 and about 15 carbon atoms, or an allyl group having between 3 and about 15 carbon atoms with the proviso that Y is different from Hi;

where a and b represent the number of Y units in Formula (I), with each of a and b being independently selected from an integer in the range of 1 to about 12; and where each R is independently selected from linear $C_1$ to $C_{10}$ alkyl groups, substituted linear $C_1$ to $C_{10}$ alkyl groups, branched $C_3$ to $C_{10}$ alkyl groups, or substituted branched $C_3$ to $C_{10}$ alkyl groups, where the one or more substituents on any substituted group are selected from HS—, S, —CN, O, N, —$NH_3$, —$C_6H_5$, P, —OH, —S(CS)S—, —S(CS)O—, —S(CS)N, or a halogen.

2. The block copolymer of claim 1, wherein each of x, y and z are independently selected from an integer in the range of about 10 to about 2,500.

3. The block copolymer of claim 1, wherein each of x, y and z are independently selected from an integer in the range of about 25 to about 1,000.

4. The block copolymer of claim 1, wherein each of a and b are independently selected from an integer in the range of 1 to about 8.

5. The block copolymer of claim 1, wherein each of a and b are independently selected from an integer in the range of 1 to about 5.

6. The block copolymer of claim 1, wherein each R is independently selected from linear $C_1$ to $C_6$ alkyl groups, substituted linear $C_1$ to $C_6$ alkyl groups, branched $C_3$ to $C_6$ alkyl groups, or substituted branched $C_3$ to $C_6$ alkyl groups, where the one or more substituents on any substituted group are selected from HS—, S, —CN, O, N, —$NH_3$, —$C_6H_5$, P, —OH, —S(CS)S—, —S(CS)O—, —S(CS)N, or a halogen.

7. The block copolymer of claim 1, wherein each R is independently selected from linear $C_1$ to $C_4$ alkyl groups, substituted linear $C_1$ to $C_4$ alkyl groups, branched $C_3$ to $C_4$ alkyl groups, or substituted branched $C_3$ to $C_4$ alkyl groups, where the one or more substituents on any substituted group are selected from HS—, S, —CN, O, N, —$NH_3$, —$C_6H_5$, P, —OH, —S(CS)S—, —S(CS)O—, —S(CS)N, or a halogen.

8. The block copolymer of claim 1, wherein the (Hi) segments are formed from one or more polymers selected from one or more polyacrylamides, one or more polyhydroxy methacrylates, one or more poly(alkyl)acrylic acids, one or more polyallylamines, one or more polyalkylene glycols, one or more poly(4-vinylpyridines), one or more polyvinyl pyrrolidones, one or more polyvinyl alcohols, copolymers produced from monomers of the aforementioned polymer compositions, or combinations of any two or more thereof.

9. The block copolymer of claim 8, wherein the one or more hydrophilic polymer segments are formed from one or more polyacrylamides.

10. The block copolymer of claim 9, wherein the one or more polyacrylamides are selected from one or more polydimethyl acrylamides.

11. The block copolymer of claim 1, wherein the (Ho) segments are formed from one or more polymers selected from one or more polysiloxanes, one or more polypropylenes, one or more polyisobutylenes, one or more perfluorinated ethers, one or more poly(allyl alkylacrylates), one or more poly(hexafluoropropylene oxides), one or more poly(methyl vinyl ethers), one or more poly(perfluoropropylene oxide-co-perfluoroformaldehyde)s, one or more poly(alkylene glycol) alkylacrylates, one or more poly(vinylidene fluoride)s, one or more poly(4-vinylphenols), one or more poly(4-vinylpyridine-co-styrene)s, one or more polylactides, one or more polycaprolactones, one or more polydioxan-2-ones, one or more polylactic-co-glycolides, one or more polylactic-co-dioxan-2-ones, one or more polylactic-co-caprolactones, one or more polyglycolic-co-caprolacton, copolymers produced from monomers of the aforementioned polymer compositions, or combinations of any two or more thereof.

12. The block copolymer of claim 11, wherein the one or more hydrophobic polymer segments are formed from one or more polysiloxane polymers, one or more polypropylene polymers, one or more perfluorinated ethers, or a combination of two or more thereof.

13. The block copolymer of claim 12, wherein the one or more hydrophobic polymer segments are formed from one or more polysiloxane polymers.

14. The block copolymer of claim 13, wherein the one or more hydrophobic polymer segments are formed from one or more polydimethylsiloxane polymers.

15. The block copolymer composition of claim 1, wherein the composition is crosslinked and/or polymerized via an initiator selected from at least one azo-based initiator compound, at least one peroxy-based initiator compound, or a combination of two or more thereof.

16. The block copolymer composition of claim 15, wherein the composition is at least crosslinked or polymerized via azobisisobutyronitrile.

17. The block copolymer composition of claim 1, wherein the composition is crosslinked via one or more mono-, di-, tri- or tetra-modified cyclopentasiloxane crosslinking composition as shown in the formula below:

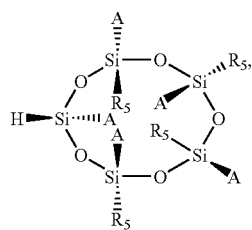

where the As are either all methyl groups, all ethyl groups, or all propyl groups, where each $R_5$ is independently selected from hydrogen, a moiety having one or more ethylene oxide units and 2 to 20 carbon atoms, a diglycol moiety that contains from 4 to about 20 carbon atoms, an ether moiety that contains from about 4 to about 20 carbon atoms, a partially or fully halogenated ether moiety that contains from about 4 to about 20 carbon atoms, or a siloxy silane moiety according to the formula shown below:

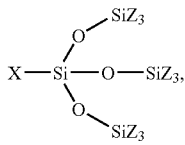

where X is a linear or branched $C_1$ to $C_{10}$ alkyl group, a linear or branched $C_2$ to $C_{10}$ alkenyl group, a linear or branched $C_2$ to $C_{10}$ alkynyl group, and where each Z is independently selected from a linear or branched $C_1$ to $C_{20}$ alkyl group, a linear or branched $C_2$ to $C_{20}$ alkenyl group, a linear or branched $C_2$ to $C_{10}$ alkynyl group, with the proviso that the crosslinking composition contains at least two H—Si bonds.

18. The block copolymer composition of claim 17, wherein the composition is crosslinked via pentamethylcyclopentasiloxane ($D_5H$).

19. An amphiphilic co-network comprising the block copolymer of claim 1.

20. A crosslinked amphiphilic network polymer film comprising the composition of claim 1.

21. A block copolymer composition comprising at least one block copolymer composition according to the following Formula:

where each R is independently selected from linear $C_1$ to $C_{10}$ alkyl groups, substituted linear $C_1$ to $C_{10}$ alkyl groups, branched $C_3$ to $C_{10}$ alkyl groups, or substituted branched $C_3$ to $C_{10}$ alkyl groups, where the one or more substituents on any substituted group are selected from HS—, S, —CN, O, N, —NH$_3$, —C$_6$H$_5$, P, —OH, —S(CS)S—, —S(CS)O—, —S(CS)N, or a halogen;

where each Y is independently selected from acrylate, methacrylate, an alkyl acrylate group having between 3 and about 15 carbon atoms, or an allyl group having between 3 and about 15 carbon atoms;

where a and b represent the number of Y units in the above Formula, with each of a and b being independently selected from an integer in the range of 1 to about 12;

where each Q is independently selected from a linear or branched $C_1$ to $C_{20}$ alkyl group;

where PDMAAm represents repeating hydrophilic polymer segments based on a polydimethyl acrylamide polymer with the number of repeating units in each PDMAAm segment being in the range of about 2 to about 5,000; and where PDMS represents repeating hydrophobic polymer segments based on a polydimethylsiloxane polymer with the number of repeating units being in the range of about 2 to about 5,000.

22. The block copolymer composition of claim 21, wherein each Q is independently selected from a linear or branched $C_2$ to $C_{10}$ alkyl group.

23. The block copolymer composition of claim 21, wherein each Q is independently selected from a linear or branched $C_2$ to $C_6$ alkyl group.

24. The block copolymer composition of claim 21, wherein the number of repeating units in each PDMAAm segment is in the range of about 10 to about 2,500.

25. The block copolymer composition of claim 21, wherein the number of repeating units in each PDMAAm segment is in the range of about 25 to about 1,000.

26. The block copolymer composition of claim 21, wherein the number of repeating units in the PDMS segment is in the range of about 10 to about 2,500.

27. The block copolymer composition of claim 26, wherein the number of repeating units in the PDMS segment is in the range of about 25 to about 1,000.

28. The block copolymer composition of claim 21, wherein each of a and b are independently selected from an integer in the range of 1 to about 8.

29. The block copolymer composition of claim 21, wherein each of a and b are independently selected from an integer in the range of 1 to about 5.

* * * * *